United States Patent
Kim

(10) Patent No.: US 11,909,500 B2
(45) Date of Patent: Feb. 20, 2024

(54) METHOD AND APPARATUS FOR INTERWORKING BETWEEN MULTIPLE DRONE COMMUNICATIONS

(71) Applicant: Electronics and Telecommunications Research Institute, Daejeon (KR)

(72) Inventor: Hee Wook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 271 days.

(21) Appl. No.: 17/526,666

(22) Filed: Nov. 15, 2021

(65) Prior Publication Data

US 2022/0407588 A1     Dec. 22, 2022

(30) Foreign Application Priority Data

Jun. 16, 2021    (KR) ........................ 10-2021-0078027

(51) Int. Cl.
     *H04B 7/185*      (2006.01)
     *H04W 76/15*      (2018.01)

(52) U.S. Cl.
     CPC ........ *H04B 7/18506* (2013.01); *H04W 76/15* (2018.02)

(58) Field of Classification Search
     CPC .. H04B 7/18506; H04W 76/15; H04W 36/30; H04W 36/18; H04W 76/32; H04W 76/22; H04W 76/20; H04W 24/10; H04W 36/08; H04W 76/14; H04W 76/30; H04W 84/06; H04W 88/06
See application file for complete search history.

(56) References Cited

U.S. PATENT DOCUMENTS

| 9,933,780 | B2 | 4/2018 | Chau et al. |
| 11,595,903 | B2 | 2/2023 | Ahn et al. |
| 2017/0201614 | A1 | 7/2017 | Deng et al. |

(Continued)

FOREIGN PATENT DOCUMENTS

| KR | 1020150117879 A | 10/2015 |
| KR | 1020180054391 A | 5/2018 |

(Continued)

OTHER PUBLICATIONS

Mr. Jim Griner, Unmanned Aircraft Systems (UAS) Integration in the National Airspace System (NAS) Project, UAS Control and Non-Payload Communication (CNPC) System Development and Testing, I-CNS Plenary, National Aeronautics and Space Administration, Apr. 22, 2015.

*Primary Examiner* — Ashley Shivers
(74) *Attorney, Agent, or Firm* — William Park & Associates Ltd.

(57) ABSTRACT

An operation method of a first communication node may comprise: establishing a first wireless connection with a GCS; establishing a second wireless connection with the GCS; transmitting and receiving data to and from the GCS through a first end-to-end connection based on the first wireless connection; reporting a communication quality of the first wireless connection to the GCS; receiving a link switch request from the GCS; switching a link from the first wireless connection to the second wireless connection based on the link switch request; and transmitting and receiving data through a second end-to-end connection based on the second wireless connection.

14 Claims, 16 Drawing Sheets

(56) References Cited

U.S. PATENT DOCUMENTS

| | | | |
|---|---|---|---|
| 2017/0357273 A1* | 12/2017 | Michini | G05D 1/0033 |
| 2018/0095460 A1 | 4/2018 | Chen et al. | |
| 2018/0139074 A1* | 5/2018 | Hong | H04W 36/16 |
| 2019/0223237 A1 | 7/2019 | Hong | |
| 2019/0333395 A1* | 10/2019 | Borshchova | H04L 9/3247 |
| 2020/0252838 A1 | 8/2020 | Akdeniz et al. | |
| 2021/0029658 A1 | 1/2021 | Mahalingam et al. | |
| 2021/0101679 A1 | 4/2021 | Han et al. | |
| 2021/0120581 A1 | 4/2021 | Kim | |

FOREIGN PATENT DOCUMENTS

| | | |
|---|---|---|
| KR | 1020180092124 A | 8/2018 |
| KR | 1020190121602 A | 10/2019 |
| KR | 1020200145829 A | 12/2020 |

* cited by examiner

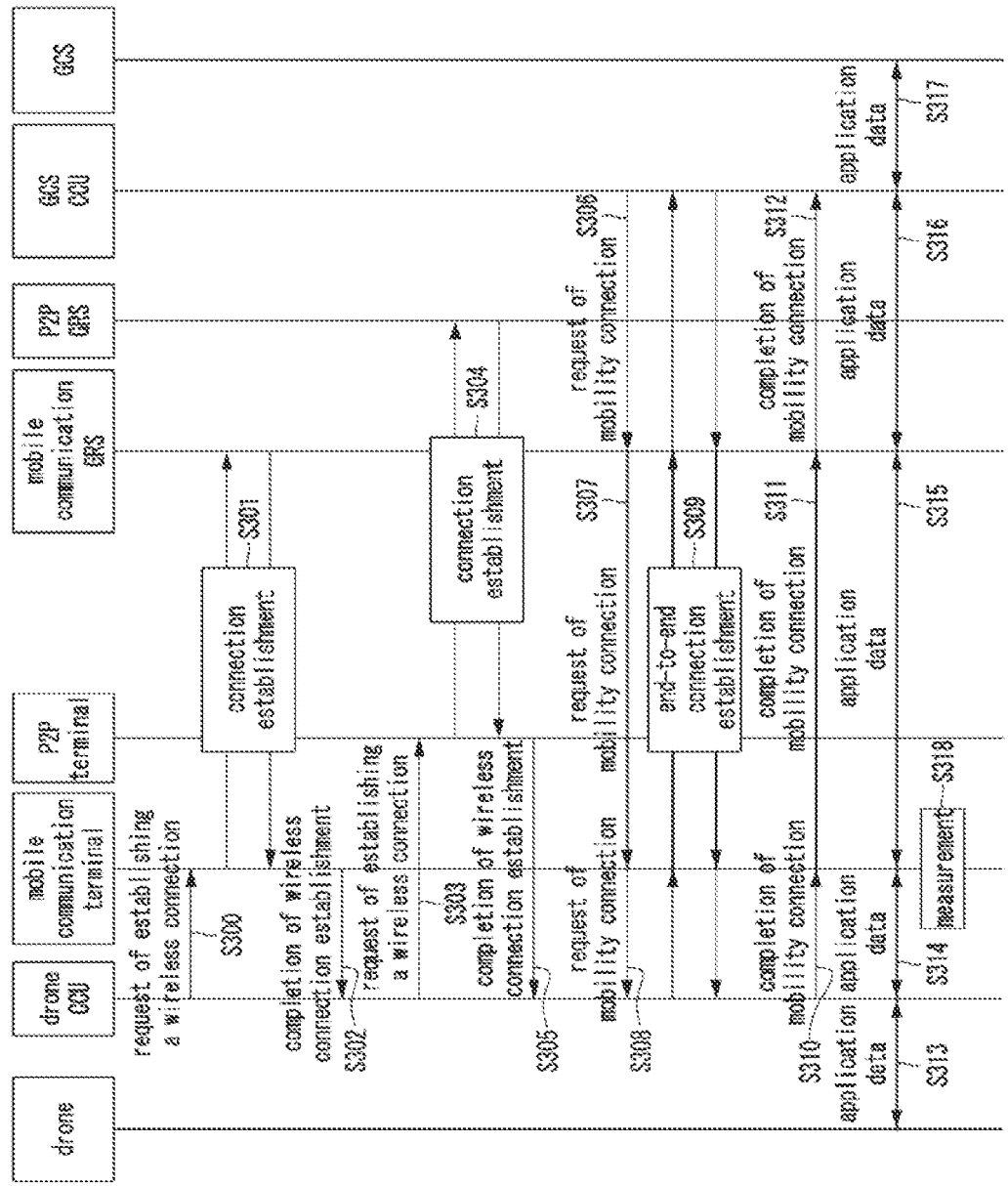

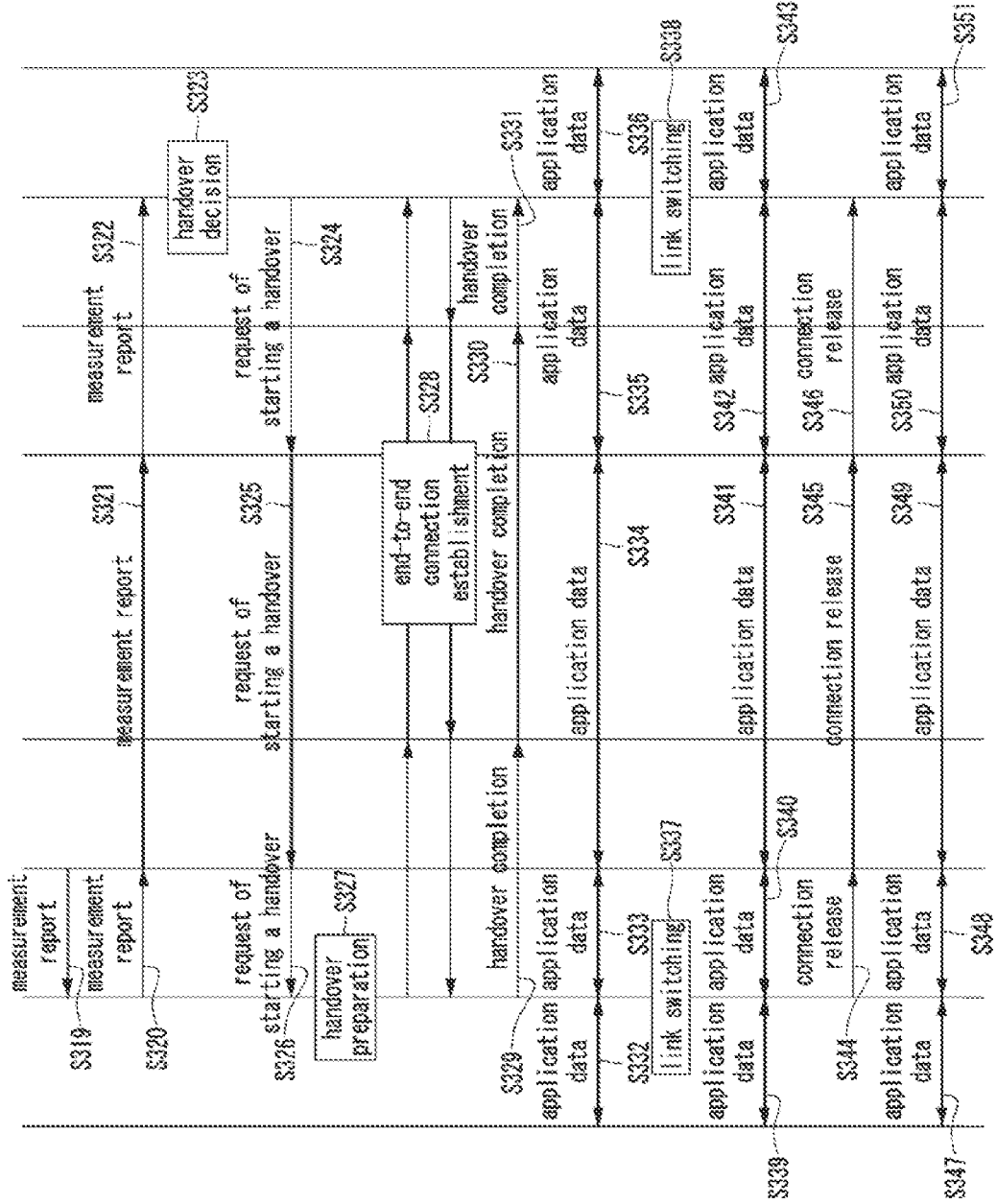

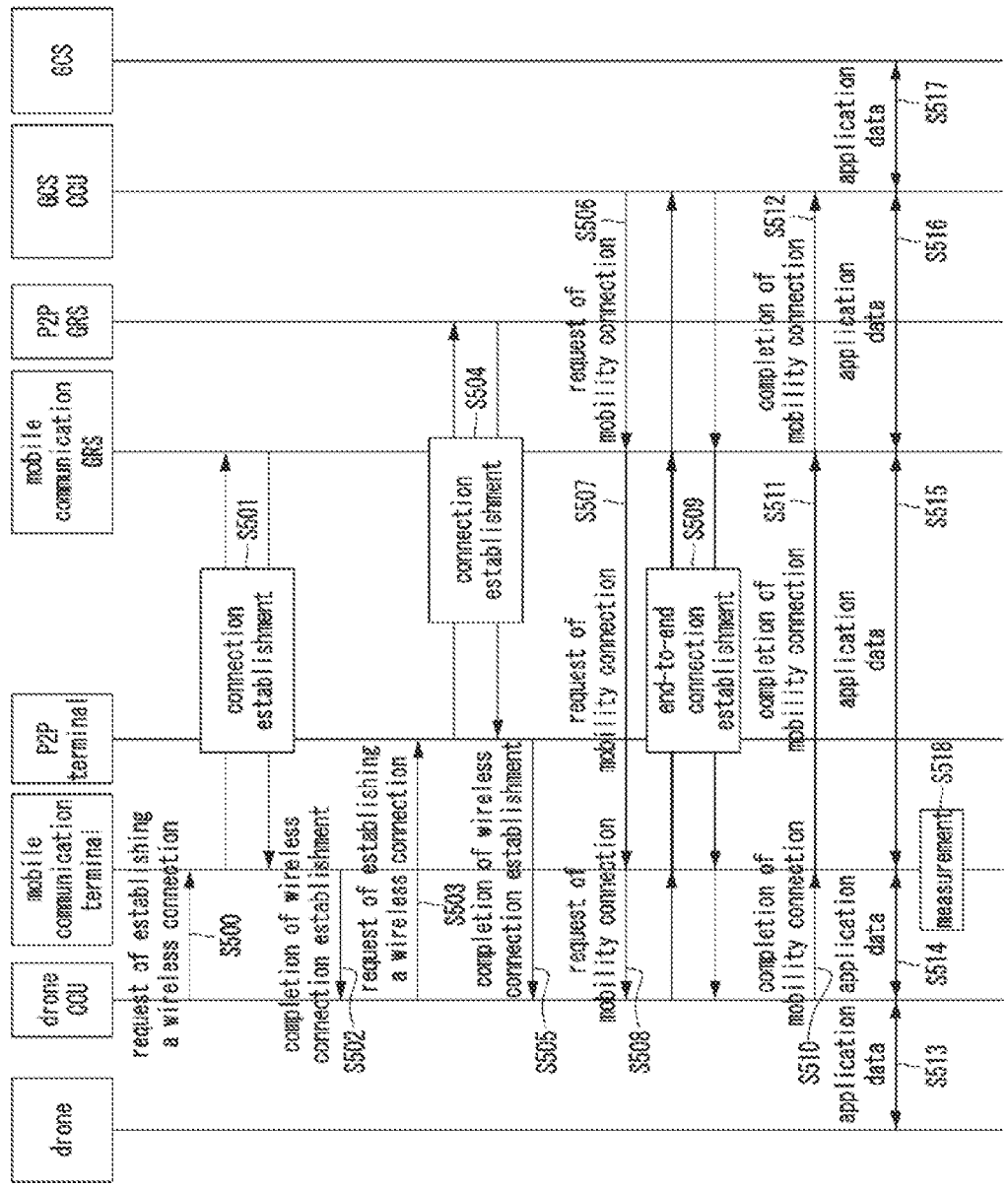

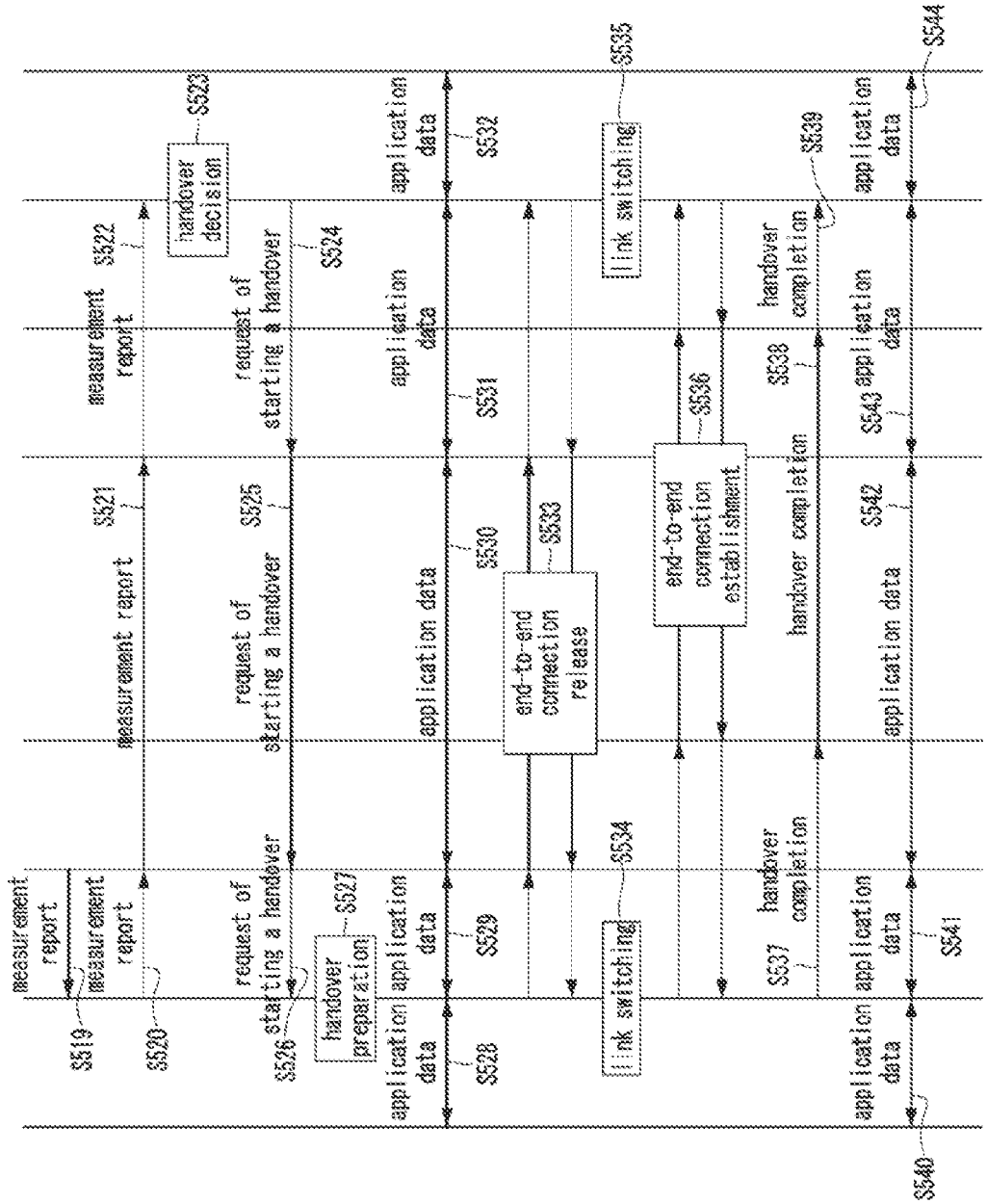

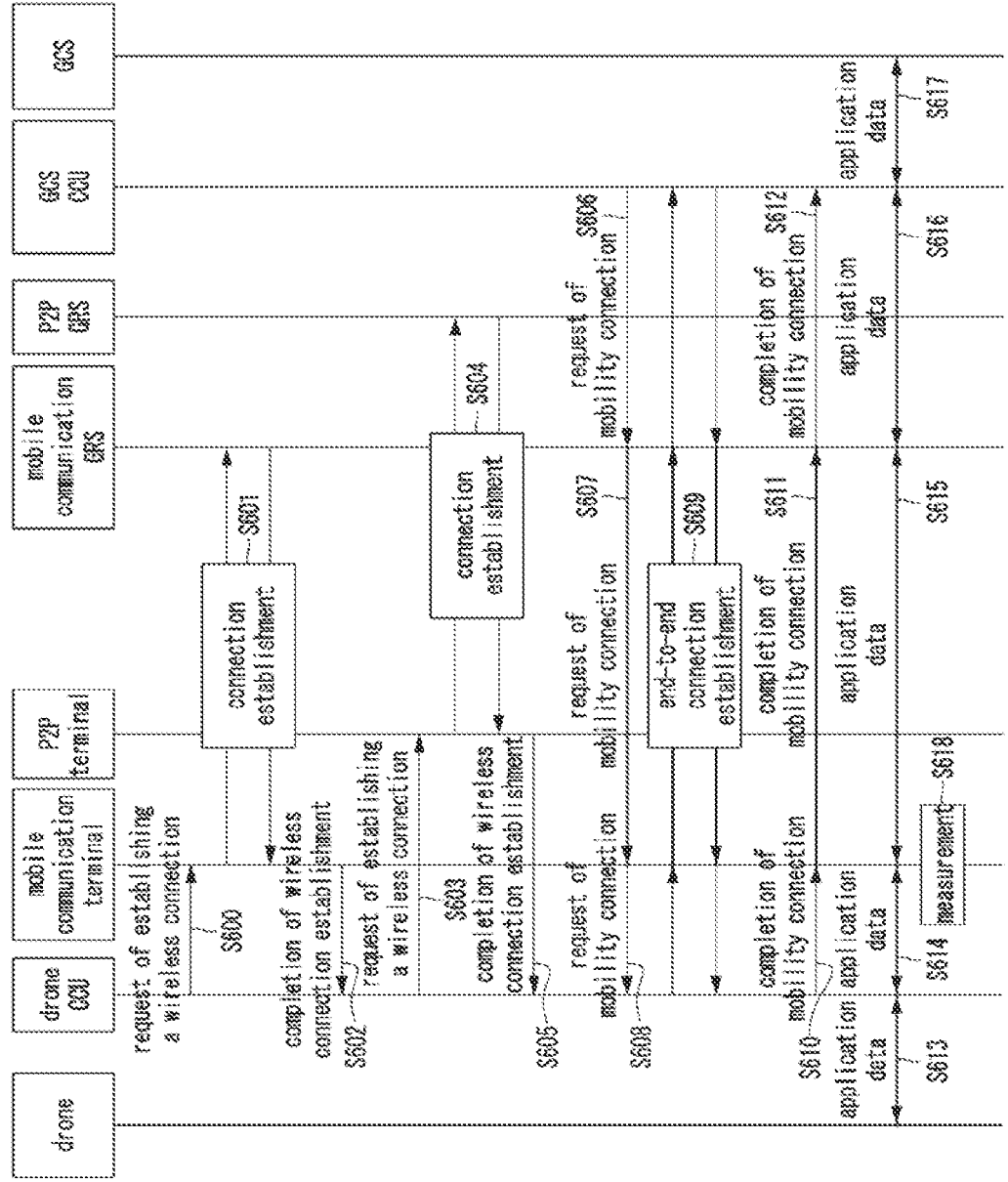

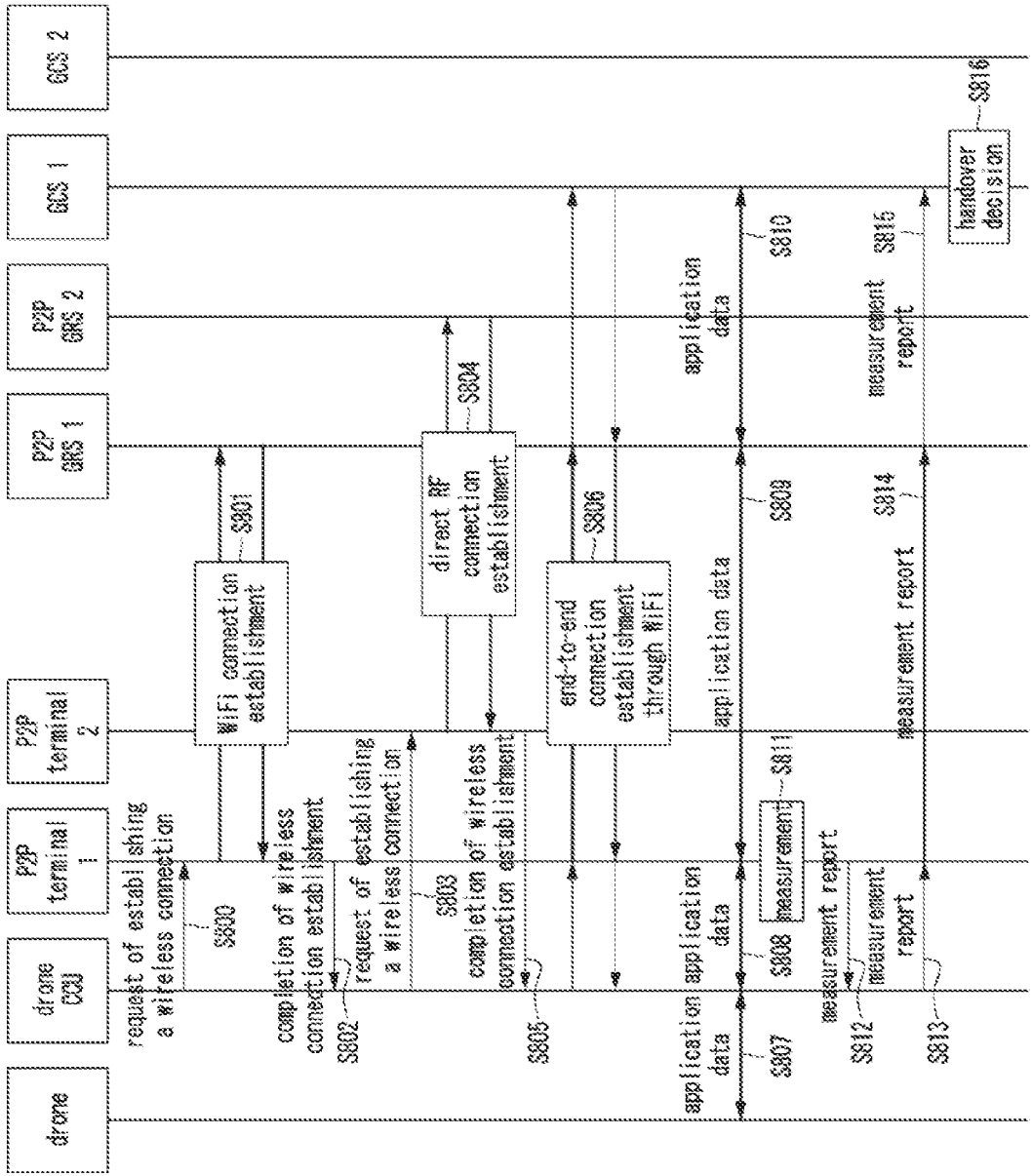

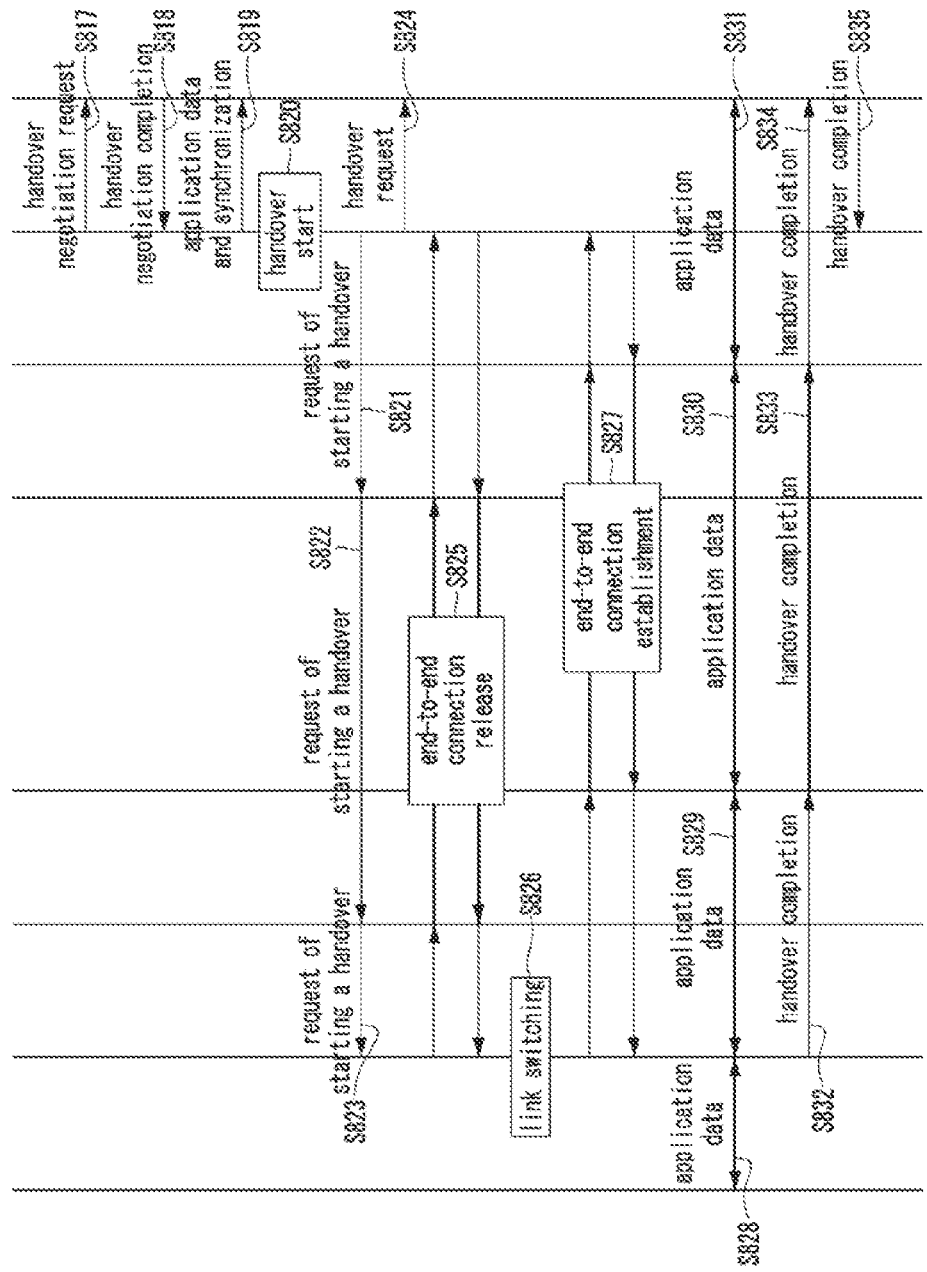

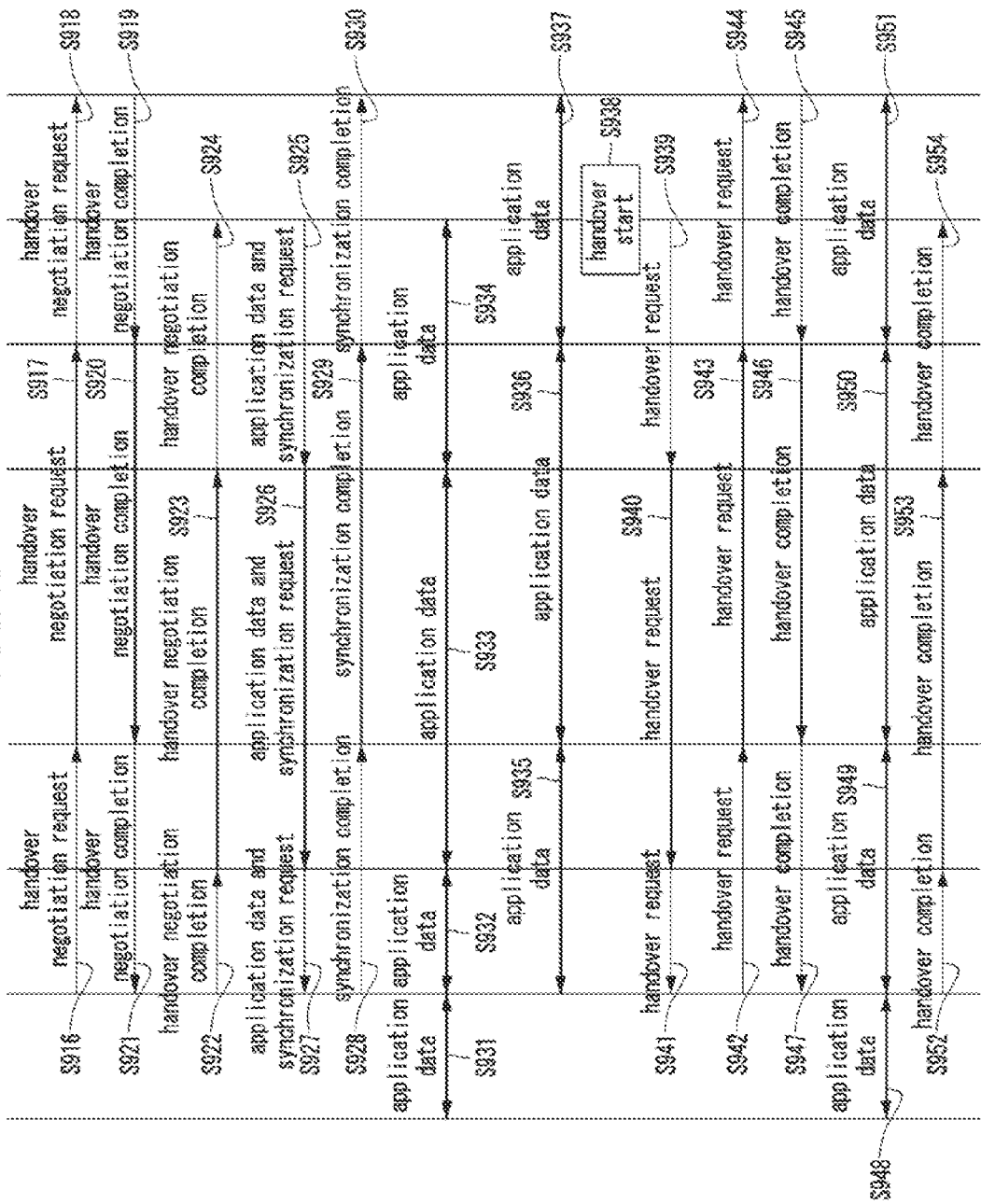

METHOD AND APPARATUS FOR INTERWORKING BETWEEN MULTIPLE DRONE COMMUNICATIONS

CROSS-REFERENCE TO RELATED APPLICATIONS

This application claims priority to Korean Patent Application No. 10-2021-0078027, filed on Jun. 16, 2021, with the Korean Intellectual Property Office (KIPO), the entire contents of which are hereby incorporated by reference.

BACKGROUND

1. Technical Field

The present disclosure relates to techniques for interworking between multiple drone communications, and more particularly, to techniques for interworking between multiple drone communications, which provide communication services through multiple communication links between a drone equipped with a plurality of communication devices and a ground control station for communication redundancy.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

Meanwhile, use of aerial vehicles (AV) or unmanned aerial vehicles (UA), such as drones, has been widely spread around the world in recent years. Currently, drones may be allowed to fly in visual line of sight (VLOS) and fly in unmanned areas without special approval. However, in order to expand the application of drones, it may be necessarily required to allowed the drones to fly in non-VLOS (e.g., beyond VLOS (BVLOS)) and fly over people. For this, the reliability of communications for drones should be guaranteed. Currently, there may be a technique using high-reliability control communication links as a technique that can secure the reliability of communications for drones. Here, the technique of using high-reliability control communication links may be a technique of securing the high-reliability communication links by using a plurality of communication links.

The most of current small drones are equipped with a mobile communication device such as LTE or 5G together with an unlicensed band device such as Wi-Fi. Bluetooth, direct radio frequency (RF) signal communication, or the like in order to increase the reliability of communication links through communication redundancy. In such the currently used drone communication redundancy, each communication device mounted on the drone may be connected to a separate ground control station (GCS). However, this method may have a disadvantage in that a handover between the GCSs is not supported.

SUMMARY

Accordingly, exemplary embodiments of the present disclosure are directed to providing methods and apparatuses for interworking between multiple drone communications, which transmit and receive data through multiple communication links for communication redundancy between a GCS and a drone equipped with multiple communication devices such as a mobile communication device, an unlicensed band communication device, and the like.

According to a first exemplary embodiment of the present disclosure, an operation method of a first communication node may comprise: establishing a first wireless connection with a ground control station (GCS); establishing a second wireless connection with the GCS; transmitting and receiving data to and from the GCS through a first end-to-end connection based on the first wireless connection; reporting a communication quality of the first wireless connection to the GCS; receiving a link switch request from the GCS; switching a link from the first wireless connection to the second wireless connection based on the link switch request; and transmitting and receiving data through a second end-to-end connection based on the second wireless connection.

The transmitting and receiving of data to and from the GCS through a first end-to-end connection may comprise: receiving a request of mobility connection from the GCS; establishing the first end-to-end connection based on the first wireless connection with the GCS according to the request of mobility connection; transmitting a mobility connection completion in response to the request of mobility connection to the GCS; and transmitting and receiving data to and from the GCS through the first end-to-end connection established in response to the request of mobility connection.

The transmitting and receiving data through a second end-to-end connection based on the second wireless connection may comprise: establishing the second end-to-end connection with the GCS based on the second wireless connection; switching the link from the first wireless connection to the second wireless connection; and transmitting and receiving data to and from the GCS through the second end-to-end connection.

The operation method may further comprise releasing the first end-to-end connection.

The transmitting and receiving data through a second end-to-end connection based on the second wireless connection may comprise: releasing the first end-to-end connection; switching the link to the second wireless connection by releasing the first wireless connection according to the release of the first end-to-end connection; establishing the second end-to-end connection with the GCS based on the second wireless connection; and transmitting and receiving application data to and from the GCS through the second end-to-end connection.

According to a second exemplary embodiment of the present disclosure, an operation method of a second communication node may comprise: establishing a first wireless connection with a first communication node; establishing a first end-to-end connection between the first communication node and a first GCS based on the first wireless connection; relaying transmission and reception of data between the first communication node and the first GCS through the first end-to-end connection; and in response to receiving a link switch request from the first GCS based on a communication quality of the first wireless connection, releasing the first end-to-end connection.

The establishing a first end-to-end connection between the first communication node and a first GCS based on the first wireless connection may comprise: receiving a request of mobility connection based on the first wireless connection from the first GCS; transmitting the received request of mobility connection to the first communication node; establishing the first end-to-end connection between the first communication node and the first GCS upon receiving a response to the request of mobility connection from the first communication node; receiving a mobility connection completion from the first communication node; and transmitting the received mobility connection completion to the first GCS.

The releasing the first end-to-end connection may comprise: receiving a communication quality of the first wireless connection from the first communication node; transmitting the received communication quality of the first wireless connection to the first GCS; receiving a link switch request from the first GCS; transmitting the received link switch request to the first communication node; and releasing the first end-to-end connection without receiving a response from the first communication node.

The operation method may further comprise: relaying a handover negotiation between the first GCS and a second GCS in cooperation with the first communication node; and synchronizing the first GCS and the second GCS in cooperation with the first communication node.

The relaying a handover negotiation may comprise: receiving a handover negotiation request from the first GCS, and transmitting the handover negotiation request to the second GCS via the first communication node; and receiving a handover completion from the second GCS via the first communication node, and transmitting the handover completion to the first GCS.

According to a third exemplary embodiment of the present disclosure, a first communication node may comprise: a processor; a memory electronically communicating with the processor; and instructions stored in the memory, wherein when executed by the processor, the instructions cause the first communication node to: establish a first wireless connection with a GCS; establish a second wireless connection with the GCS; transmit and receive data to and from the GCS through a first end-to-end connection based on the first wireless connection; report a communication quality of the first wireless connection to the GCS; receive a link switch request from the GCS; switch a link from the first wireless connection to the second wireless connection based on the link switch request; and transmit and receive data through a second end-to-end connection based on the second wireless connection.

In the transmitting and receiving of the data through the first end-to-end connection, the instructions may cause the first communication node to: receive a request of mobility connection from the GCS; establish the first end-to-end connection based on the first wireless connection with the GCS according to the request of mobility connection; transmit a mobility connection completion in response to the request of mobility connection to the GCS; and transmit and receive data to and from the GCS through the first end-to-end connection established in response to the request of mobility connection.

In the transmitting and receiving of the data through the second end-to-end connection, the instructions may cause the first communication node to: establish the second end-to-end connection with the GCS based on the second wireless connection; switch the link from the first wireless connection to the second wireless connection; and transmit and receive data to and from the GCS through the second end-to-end connection.

In the transmitting and receiving of the data through the second end-to-end connection, the instructions may cause the first communication node to: release the first end-to-end connection; switch the link to the second wireless connection by releasing the first wireless connection according to the release of the first end-to-end connection; establish the second end-to-end connection with the GCS based on the second wireless connection; and transmit and receive application data to and from the GCS through the second end-to-end connection.

According to the present disclosure, when a drone is equipped with a mobile communication device for LTE or 5G communication and an unlicensed band device for Wi-Fi or direct RF signal communication, and uses them to perform communications through communication redundancy, a communication link switching between multiple communication links can be supported. In addition, according to the present disclosure, when communication link switching between multiple communication links is performed, a communication link between a drone and a GCS may not be interrupted except for a very short time during which the link switching is performed, so that data transmission and reception can be performed without interruption. In addition, according to the present disclosure, when a drone is connected with different GCSs through different communication links based on communication redundancy, a handover between the GCSs can be supported. In addition, since the data transmission and reception without interruption during the handover are made possible according to the present disclosure, the reliability of the communication link for safe operations of the drone can be improved. In addition, according to the present disclosure, it is made possible to expand the application of the drones by ensuring the safety of flying in non-VLOS environment or flying over people.

BRIEF DESCRIPTION OF DRAWINGS

FIGS. 3A and 3B show a sequence chart illustrating a first exemplary embodiment of a method for interworking between multiple drone communications.

FIGS. 5A and 5B show a sequence chart illustrating a third exemplary embodiment of a method for interworking between multiple drone communications.

FIGS. 6A and 6B show a sequence chart illustrating a fourth exemplary embodiment of a method for interworking between multiple drone communications.

FIGS. 8A and 8B show a sequence chart illustrating a sixth exemplary embodiment of a method for interworking between multiple drone communications.

FIGS. 9A and 9B show a sequence chart illustrating a ninth exemplary embodiment of a method for interworking between multiple drone communications.

DETAILED DESCRIPTION OF THE EMBODIMENTS

Figure 1:
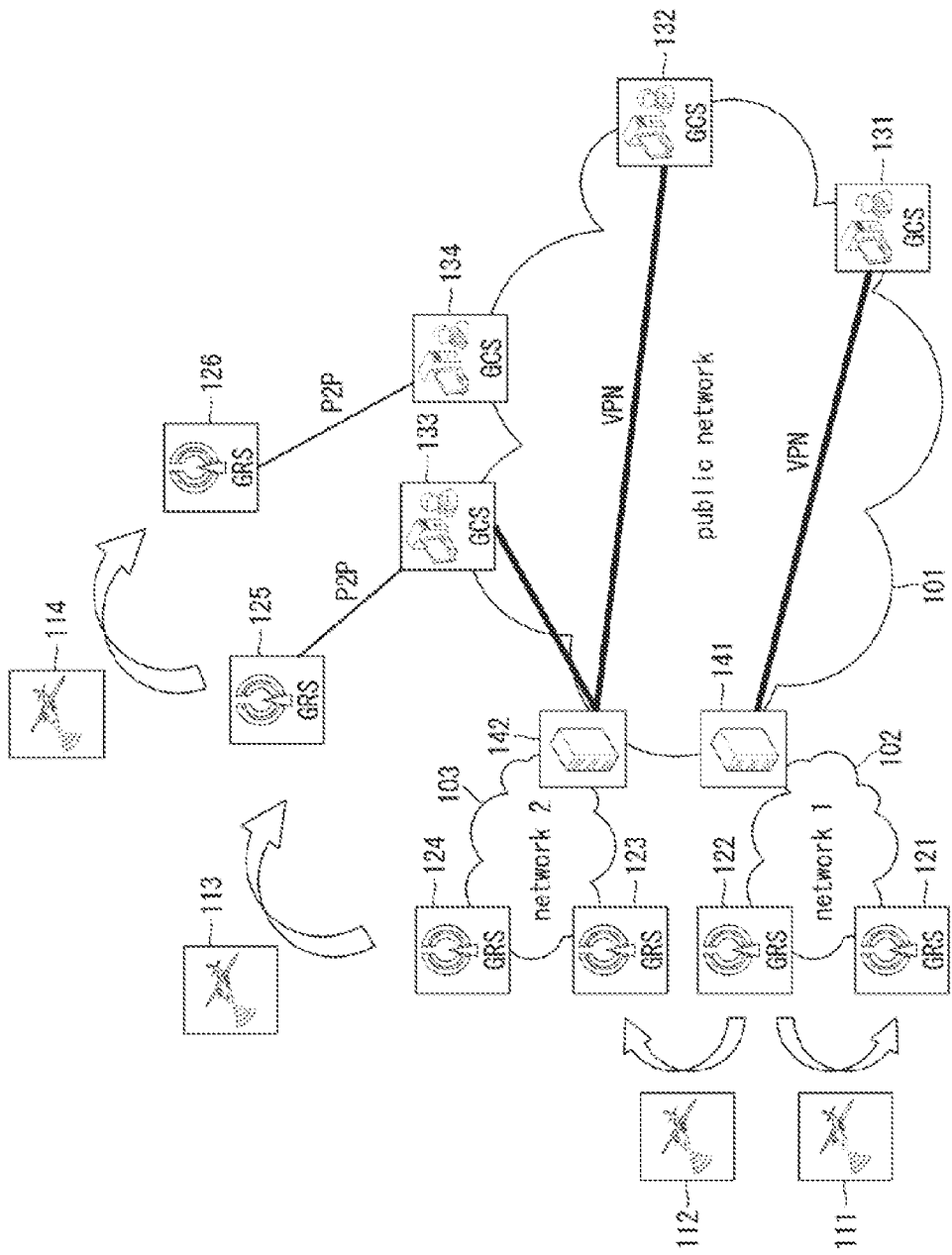
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system may include a public network 101, a first network 102, a second network 103, a plurality of drones 111 to 114, a plurality of ground radio stations (GRSs) 121 to 126, a plurality of ground control stations (GCSs) 131 to 134, and a plurality of gateways 141 and 142. In particular, the plurality of GCSs 131 to 134 may be connected to the plurality of gateways 141 and 142 through virtual private networks (VPNs). On the other hand, the first network 102, which is a mobile communication network, may provide mobile communication services to the plurality of unmanned drones 111 to 114 through the plurality of GRSs 121 and 122. Each of the plurality of GRSs 121 and 122 and the plurality of drones 111 to 114 may support a code division multiple access (CDMA)-based communication protocol, wideband CDMA (WCDMA)-based communication protocol, time division multiple access (TDMA)-based communication protocol, frequency division multiple access (FDMA)-based communication protocol, orthogonal frequency division multiplexing (OFDM)-based communication protocol, orthogonal frequency division multiple access (OFDMA)-based communication protocol, single carrier-FDMA (SC-FDMA)-based communication protocol, non-orthogonal multiple access (NOMA)-based communication protocol, space division multiple access (SDMA)-based communication protocol, and/or the like.

Each of the plurality of GRSs 121 and 122 may be referred to as a NodeB, evolved NodeB (eNB), base transceiver station (BTS), radio base station, radio transceiver, access point, access node, road side unit (RSU), digital unit (DU), cloud digital unit (CDU), radio remote head (RRH), radio unit (RU), transmission point (TP), transmission and reception point (TRP), relay node, and/or the like. Each of the plurality of GRSs 121 and 122 may support cellular communication (e.g., long term evolution (LTE), LTE-Advanced (LTE-A), new radio (NR), or the like defined in the $3^{rd}$ generation partnership project (3GPP) specifications). The plurality of GRSs 121 and 122 may operate in different frequency bands, or may operate in the same frequency band. The plurality of GRSs 121 and 122 may be connected to each other through an ideal backhaul or non-ideal backhaul, and may exchange information with each other through the ideal backhaul or non-ideal backhaul. The plurality of GRSs 121 and 122 may be connected to the GCSs 131 to 134 through the first gateway 141. Each of the plurality of GRSs 121 and 122 may transmit signals received from the GCSs 131 to 134 to the drones 111 to 114, and transmit signals received from the drones 111 to 114 to the GCSs 131 to 134.

Each of the plurality of GRSs 121 and 122 may support OFDMA-based downlink (DL) transmission, and may support SC-FDMA-based uplink (UL) transmission. In addition, each of the plurality of GRSs 121 and 122 may support multiple input multiple output (MIMO) (e.g., single user (SU)-MIMO, multi user (MU)-MIMO, massive MIMO, etc.) transmission, coordinated multipoint (CoMP) transmission, carrier aggregation (CA) transmission, unlicensed band transmission, device-to-device (D2D) communication between terminals (or, proximity services (ProSe)), and/or the like.

On the other hand, the second network 103 may be a control and non-payload communication (CNPC) network, and may provide CNPC links among the plurality of GRSs 123 and 124 and the plurality of drones 111 to 114. In particular, the CNPC links may be links for transferring data related to flight control of the drones 111 to 114, unmanned aircraft systems (UAS) status monitoring, and CNPC link management, and may be configured as pilot or air traffic control center (ATC) relay links and UAS control links. The pilot or ATC relay link may be a communication link for relaying voice and data between the ATC and a remote pilot through the drones 111 to 114, and the UAS control link may be a link for transmitting control information related to safe operations between the pilot and the drones 111 to 114. The UAS control link may be further divided into a remote command (telecommand, TC) link and a telemetry (TM) link. The TC link may be an uplink that delivers flight trajectory information, control information, etc. of the drones from the pilot on the ground to the drones 111 to 114, and the TM link may be a downlink that delivers information on positions, altitudes, and speeds of the drones 111 to 114, system operation mode and status of the UAS system, navigation data, tracking/weather radar/image information related to detection and avoidance, etc. from the drones 111 to 114 to the pilot on the ground. As a frequency for the CNPC links of the drones 111 to 114, the C band (i.e., 5030-5091 MHz) allocated as a new dedicated band by the world radiocommunication conference 2012 (WRC-12) may be mainly considered. In addition, a band allocated for aeronautical mobile services such as the L band (i.e., 960-1164 MHz), for which the WRC-12 defined a guideline for use in the aeronautical mobile services, also may be considered. In case of the C band, it has the advantage of low frequency crosstalk effect with the existing systems and low multipath delay spread, but the use of directional antennas may have to be considered to secure a link margin, and the Doppler effect may be five times larger than that of the L band. On the other hand, in case of a different low frequency band allocated for aeronautical mobile services, such as the L band, the propagation characteristics may be better than those of the C band (e.g., in the L band, a propagation loss may be about 14 dB lower than the C band). However, since the existing flight systems such as the distance measurement equipment (DME), automatic dependent surveillance-broadcast (ADS-B), and tactic air navigation system (TACAN) use the frequency band in a congested state, such the band may have difficulties in securing frequency resources. Also, such the frequency band may have a disadvantage in multipath delay spread. Therefore, in general, the previously secured C band may be considered for a basic link for the CNPC, and it may be expected that a low frequency band (e.g., L band, etc.) is additionally used to increase the availability of the CNPC link for safe operations of the drones 111 to 114.

As a link connection type for the CNPC link, there may be a point-to-point (P2P) type and a point-to-multipoint (P2MP) type. The P2P type may be a concept in which one GRS 122 or 123 establishes a data link with one drone (i.e., one of the drones 111 to 114). In contrast, in the P2MP type, one GRS 123 or 124 may establish a data link with a plurality of drones.

On the other hand, the GRSs 125 and 126 may provide unlicensed band communication services to the drones 111 to 114 through Wi-Fi and direct RF frequency communication. In this case, the GRSs 125 and 126 and the corresponding GCSs 133 and 134 may be connected in the P2P scheme. In addition, the GRSs 125 and 126 may provide P2P CNPC communication services to the drones 111 to 114 through P2P CNPC links. In this case, the GRSs 125 and 126 and the corresponding GCSs 133 and 134 may be connected in the P2P scheme. Here, the GRSs 125 and 126 and the corresponding drones 111 to 114 may communicate in a stand-alone manner.

Meanwhile, each of the drones 111 to 114 may be equipped with a mobile communication device such as LTE or 5G communication, may be equipped with an unlicensed band device such as Wi-Fi or direct RF signal communication, and may be equipped with a CNPC network device such as a CNPC communication device, thereby increasing the reliability of the communication link through communication redundancy. The drones 111 to 114 may receive mission information provided from the GCSs 131 to 134, respectively, and such the mission information may be received through the GRSs 121 to 126. In this case, the mission information may include information indicating movement of the drones 111 to 114 (i.e., movement indication information) and information indicating missions to be processed by the drones 111 to 114 (i.e., mission indication information). Accordingly, the drones 111 to 114 may identify the movement indication information from the mission information, and may move to corresponding positions based on the identified movement indication information. For example, the movement indication information may include movement location information indicating a location to which each of the drones 111 to 114 is to move, and movement path information indicating a path from a current location of each of the drones 111 to 114 to the location to which each of the drones 111 to 114 is to move. Here, the movement path information may include information of at least one way point, and the information of at least one way point may include information of a coordinate (e.g., longitude and latitude) and an altitude of each of the at least one way point.

Meanwhile, each of the GCSs 131 to 134 may provide an input interface capable of receiving a control command for controlling the drones 111 to 114. The input interface may include hardware input keys or software input keys displayed on a display device capable of receiving touch inputs. The GCSs 131 to 134 may identify user inputs input through the input interface while providing the input interface. Then, based on a predefined relationship between the user input from the input interface and a control command, the GCSs 131 to 134 may identify the control command indicated by the user input, and may generate mission information including the control command.

The GCSs 131 to 134 may transmit the mission information for controlling the movement of the drones 111 to 114 to the drones 111 to 114. As described above, the mission information may include movement location information, movement path information, and the like, or may include speed control information, movement direction control information, and the like. Meanwhile, the first gateway 141 may provide interfaces between the first network 102 and the public network 101, and the second gateway 142 may provide interfaces between the second network 103 and the public network 101.

Meanwhile, each of the drones 111 to 114, the GRSs 121 to 126, GCSs 131 to 134, and gateways 141 and 144 constituting the communication system may have the following structure as a communication node.

Figure 2:
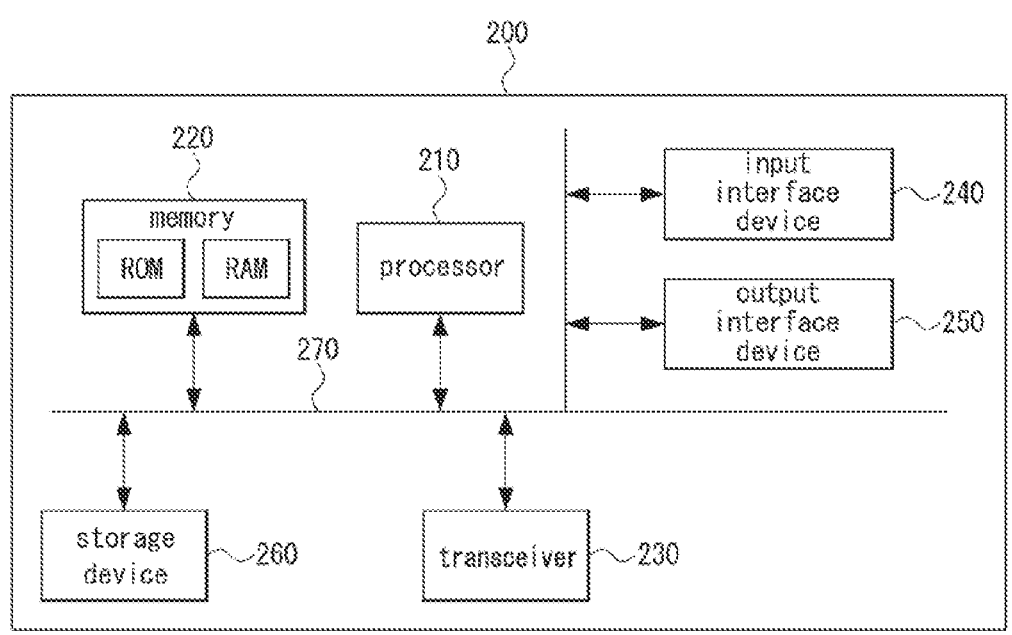
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the drones may be a technology convergence platform of the 4$^{th}$ industrial revolution, and as a high value-added new industry field, the application domain thereof may be expanded to all industries through the convergence with the existing industries and services. In particular, uses of the drones are expected to grow rapidly from the past military and leisure uses to the public and commercial markets such as disaster response, surveillance monitoring, and delivery. In addition, the drones are expected to be used in various fields such as video shooting, delivery, emergency disaster, agriculture, and surveillance, and competition for preoccupation of the drone industry may be fierce in developed countries. In particular, the next-generation drone industry may be a field in which synergy is expected by convergence with IT technologies and various services, as global ICT companies such as Google and Amazon are expanding their market entry in addition to aviation manufacturers.

As described above, as the demand for the drones in the private and public domains expands with the development of technology, in order to operate a large number of drones for various applications anytime and anywhere, integration of drones into national airspace and operation of drones in non-VLOS environments may be required.

Accordingly, long-distance and broadband wireless communication technologies for missions may be required to support various applications such as high-reliability control communication and high-definition video for stable entry of drones into national airspace and reliable flight in the non-VLOS environment. For this purpose, various wireless communication technologies operating in a drone-dedicated licensed band (e.g., C band), a commercially licensed band (e.g., cellular band), and an unlicensed band (e.g., 2.4/5.8 GHz) may be currently used or considered.

Currently, the drones may only be allowed to fly in the VLOS environments and fly in unmanned areas, unless there is a special approval. However, the drones may be necessarily required to fly in the non-VLOS environment and fly over people in order to expand their applications, and for this, the communication reliability of the drones should be guaranteed. A currently technology capable of securing the communication reliability of the drones may be a high reliability communication link for control and a detection and avoidance technology. In order to secure the high-reliability control communication link, a high-reliability communication link may be used, and the high-reliability communication link may be secured by using a plurality of communication links (i.e., communication redundancy). The case where the drone uses a wireless communication technology operating in a dedicated licensed band may correspond to the former case of using a communication link having high reliability, and the case of using and multiplexing a commercial licensed band communication and an unlicensed band communication may correspond to the latter case. Since the dedicated licensed band communication devices of the drones are difficult to be used for small drones in terms of cost, size, weight, and power consumption, most of the small drones currently use LTE or mobile communication devices such as 5G and unlicensed band devices such as WI-FI and direct RF at the same time to increase the reliability of the communication link through communication redundancy.

However, in the currently used communication redundancy for the drone, each communication device mounted on the drone may be connected to a separate GCS. For example, when one GCS does not communicate smoothly with a first communication device of the drone, another GCS may communication with a second communication device of the drone. To this end, the drone should always be connected to at least two GCSs, and an overriding concept that ignores data of a low priority GCS when data is transmitted from a high priority GCS may be applied. In the above-described scheme, if the drone is overridden to a GCS having a lower priority, there may be a disadvantage in that the drone may not be handed over to a GCS having a higher priority. Therefore, an interworking technique for appropriate and seamless handover between two GCSs, which can seamlessly switch a communication link between two communication links according to a situation, without applying the such the overriding concept, may be proposed.

For reference, the handover of the drone 111 from the GRS 122 connected to the first network 102 to the GRS 121 connected to the same first network 102 may be referred to as 'intra-network handover'. In contrast, the handover of the drone 112 from the GRS 122 connected to the first network 102 to the GRS 123 connected to the second network 103, which is another network, may be referred to as 'inter-network handover'. On the other hand, the handover of the drone 113 from the GRS 124 connected to the second network 103 to the GRS 125 connected to the GCS 133 in a standalone manner may be referred to as 'handover to standalone'. In contrast, the handover of the drone 114 from the GRS 125 connected to the GCS 133 in a standalone manner to the GRS 126 connected to the GCS 134 in a standalone manner may be referred to as 'handover between standalone'.

Meanwhile, the proposed interworking technique may support seamless switching between multiple communication links for the drones 111 to 114 when communication redundancy is supported through multiple communication links. In addition, by supporting seamless handover between the GCSs 131 to 134 and improving the reliability of the communication links for safe operation of the drones 111 to 114, the application of the drones 111 to 114 may be extended by ensuring the safety of flying in the non-VLOS environment or flying over people.

In addition, the proposed interworking technique enables seamless transmission and reception of application data such as TC data, TM data, and mission data between the GCSs 131 to 134 and the drones 111 to 114, which are equipped with multiple communication devices including mobile communication devices such as LTE or 5G communication and unlicensed band communication devices such as Wi-Fi and direct RF communication. Further, the proposed interworking technique enables seamless transfer control between the GCS 131 to 134. Here, the LTE or 5G communication may be considered as a network-based communication scheme, and the Wi-Fi may be considered as a P2P-based communication scheme. However, a dedicated communication network for drones such as a CNPC dedicated network and P2P communication techniques for drones such as a CNPC P2P communication, Bluetooth, and direct RF communication may also be applied. Here, scenarios for the proposed interworking technique may be as follows.

(1) Interworking Scenario 1: Handover between a network-based communication link (e.g., LTE/5G) and a P2P link (e.g., WI-FI)
    Interworking Scenario 1-1: Network-to-P2P handover based on Make-Before-Break
    Interworking Scenario 1-2: P2P-to-Network Handover based on Make-Before-Break
    Interworking Scenario 1-3: Network-to-P2P handover based on Break-Before-Make
    Interworking Scenario 1-4: P2P-to-Network Handover based on Break-Before-Make (2) Interworking Scenario 2: Handover between a network1-based communication link (e.g., LTE/5G) and a network2-based communication link (e.g., CNPC)
    Interworking Scenario 2-1: Network1-to-Network2 handover based on Make-Before-Break
    Interworking Scenario 2-2: Network2-to-Network1 handover based on Make-Before-Break
    Interworking Scenario 2-3: Network1-to-Network2 handover based on Break-Before-Make
    Interworking Scenario 2-4: Network2-to-Network1 handover based on Break-Before-Make (3) Interworking Scenario 3: Handover between a P2P1 link (e.g., WI-FI) and a P2P2 link (e.g., CNPC)
    Interworking Scenario 3-1: P2P1-to-P2P2 handover based on Make-Before-Break
    Interworking Scenario 3-2: P2P2-to-P2P1 handover based on Make-Before-Break
    Interworking Scenario 3-3: P2P1-to-P2P2 handover based on Break-Before-Make
    Interworking Scenario 3-4: P2P2-to-P2P1 handover based on Break-Before-Make (4) Interworking Scenario 4: Handover of a GCS between a network-based communication link (e.g., LTE/5G) and a P2P link (WI-FI)
    Interworking Scenario 4-1: Network-to-P2P handover based on Make-Before-Break
    Interworking Scenario 4-2: P2P-to-Network Handover based on Make-Before-Break
    Interworking Scenario 4-3: Network-to-P2P handover based on Break-Before-Make
    Interworking Scenario 4-4: P2P-to-Network Handover based on Break-Before-Make (5) Interworking Scenario 5: Handover of a GCS between a network1-based communication Link (e.g., LTE/5G) and a network2-based communication link (e.g., CNPC)
    Interworking Scenario 5-1: Network1-to-Network2 handover based on Make-Before-Break
    Interworking Scenario 5-2: Network2-to-Network1 handover based on Make-Before-Break
    Interworking Scenario 5-3: Network1-to-Network2 handover based on Break-Before-Make
    Interworking Scenario 5-4: Network2-to-Network1 handover based on Break-Before-Make (6) Interworking Scenario 6: Handover of a GCS between a P2P1 link (e.g., WI-FI) and a P2P2 link (e.g., CNPC)
    Interworking Scenario 6-1: P2P1-to-P2P2 handover based on Make-Before-Break
    Interworking Scenario 6-2: P2P2-to-P2P1 handover based on Make-Before-Break
    Interworking Scenario 6-3: P2P1-to-P2P2 handover based on Break-Before-Make
    Interworking Scenario 6-4: P2P2-to-P2P1 handover based on Break-Before-Make Hereinafter, Interworking Scenarios 1 to 6 may be described in detail with reference to FIGS. 3 to 9. For Interworking Scenarios 1 to 6, each of the drones 111 to 114 may include a communication control unit (CCU) capable of controlling and managing a plurality of communication devices. In addition, each of the GCSs 131 to 134 may also require a CCU when a plurality of communication links are connected. However, when each of the GCSs 131 to 134 has one communication link, and handover between the GCSs is performed, the CCU may not be required at the GCS.

FIGS. 3A and 3B show a sequence chart illustrating a first exemplary embodiment of a method for interworking between multiple drone communications.

Referring to FIGS. 3A and 3B, in a method for interworking between multiple drone communications, a drone CCU mounted on a drone may request establishment of a wireless connection from a mobile communication terminal that supports LTE or 5G mounted on the drone (S300). Accordingly, the mobile communication terminal may establish a wireless connection with a mobile communication GRS that is connected to a GCS and supports LTE or 5G (S301). Thereafter, the mobile communication terminal may report the establishment of the wireless connection to the drone CCU (S302), and may be in a standby state. On the other hand, the drone CCU mounted on the drone may request establishment of a wireless connection from a P2P terminal supporting Wi-Fi or direct RF communication mounted on the drone (S303). Accordingly, the P2P terminal may establish a wireless connection with a P2P GRS that is connected to the GCS and supports Wi-Fi or direct RF communication (S304). Thereafter, the P2P terminal may report the establishment of the wireless connection to the drone CCU (S305), and may be in a standby state.

On the other hand, when a CCU of the GCS (i.e., GCS CCU) prefers an LTE or 5G communication link, it may transmit a request of mobility connection (e.g., link switch request) to an LTE or 5G communication link to the drone CCU through the mobile communication GRS and the mobile communication terminal (S306 to S308). Upon receiving the request of mobility connection, the drone CCU and the GCS CCU may establish an end-to-end connection (S309) and complete the mobility connection (S310 to S312). When the end-to-end connection establishment between the drone CCU and the GCS CCU is completed as in the above-described manner, application data such as TC data, TM data, and mission data may be transmitted and received between the drone and the GCS through the LTE or 5G communication link (S313 to S317). While the communication link is operated in the above-described manner, the mobile communication terminal may measure a communication quality (e.g., signal strength, signal-to-noise-plus-interference ratio (SINR), signal-to-noise ratio (SNR), etc.) of the LTE or 5G communication link (S318), and periodically report the measured communication quality to the GCS CCU via the drone CCU (S319 to S322).

The GCS CCU may determine a handover when the communication link quality does not satisfy a required performance threshold based on the periodically reported communication quality (S323). In addition, when the GCS CCU determines the handover, it may initiate a handover procedure and request the drone CCU to start the handover through the LTE or 5G communication link (S324 to S326). The drone CCU receiving the handover start request may prepare for the handover (S327), and may establish another end-to-end connection with the GCS CCU through the previously established Wi-Fi or direct RF communication link (S328).

Of course, unlike the above-described procedure, the drone CCU may not establish the Wi-Fi or direct RF communication link in advance, and after receiving the handover start request from the GCS CCU, it may proceed with the establishment process. In this case, since the P2P terminal does not enter the standby state in advance, there is an advantage in that power consumption can be reduced, but there may be a delay when a quick handover is required. Accordingly, in consideration of the safety of flight operations, it may be preferable that the drone CCU completes the establishment of the Wi-Fi or direct RF communication link in advance and the P2P terminal waits in the standby state.

Upon completion of the establishment of the end-to-end connection based on the Wi-Fi or direct RF communication, the drone CCU may report the completion of the handover to the GCS CCU (S329 to S331). In addition, the drone CCU may switch its communication link from the LTE or 5G communication link to the Wi-Fi or direct RF communication link (S337) to transmit/receive data through the Wi-Fi or direct RF communication link. In this case, the GCS CCU may also switch its communication link from the LTE or 5G communication link to the Wi-Fi or direct RF communication link (S338) to transmit/receive data through the Wi-Fi or direct RF communication link. Accordingly, application data such as TC, TM, and mission data between the drone and the GCS may be transmitted/received through the Wi-Fi or direct RF communication link (S339 to S343). Of course, before the drone CCU and the GCS CCU switch their communication link from the LTE or 5G communication link to the Wi-Fi or direct RF communication link, application data may still be transmitted and received through the LTE or 5G communication link (S329 to S331). As such, the communication link between the drone CCU and the GCS CCU may not be interrupted except for a very short time during which the drone CCU and the GCS CCU perform the link switching, so that seamless data transmission and reception may be possible. The drone CCU may release the LTE or 5G based end-to-end communication link when data transmission/reception starts through the Wi-Fi or direct RF based end-to-end communication link (S344 to S346), and the LTE or 5G communication link may be remained in the established state. Here, the drone CCU may release the LTE or 5G communication link to reduce power consumption. Thereafter, application data such as TC data, TM data, and mission data between the drone and the GCS may be continuously transmitted/received through the Wi-Fi or direct RF communication link (S347 to S351).

In the first exemplary embodiment of the method for interworking between multi-drone communications as described above, the P2P terminal may be a Wi-Fi slave, and the P2P GRS may be an access point that is a Wi-Fi master. In contrast, in the first exemplary embodiment, the P2P terminal may be a direct RF terminal, and the P2P GRS may be a direct RF radio station. In addition, the first exemplary embodiment may show a specific handover procedure for Interworking Scenario 1-1.

Figure 4A:
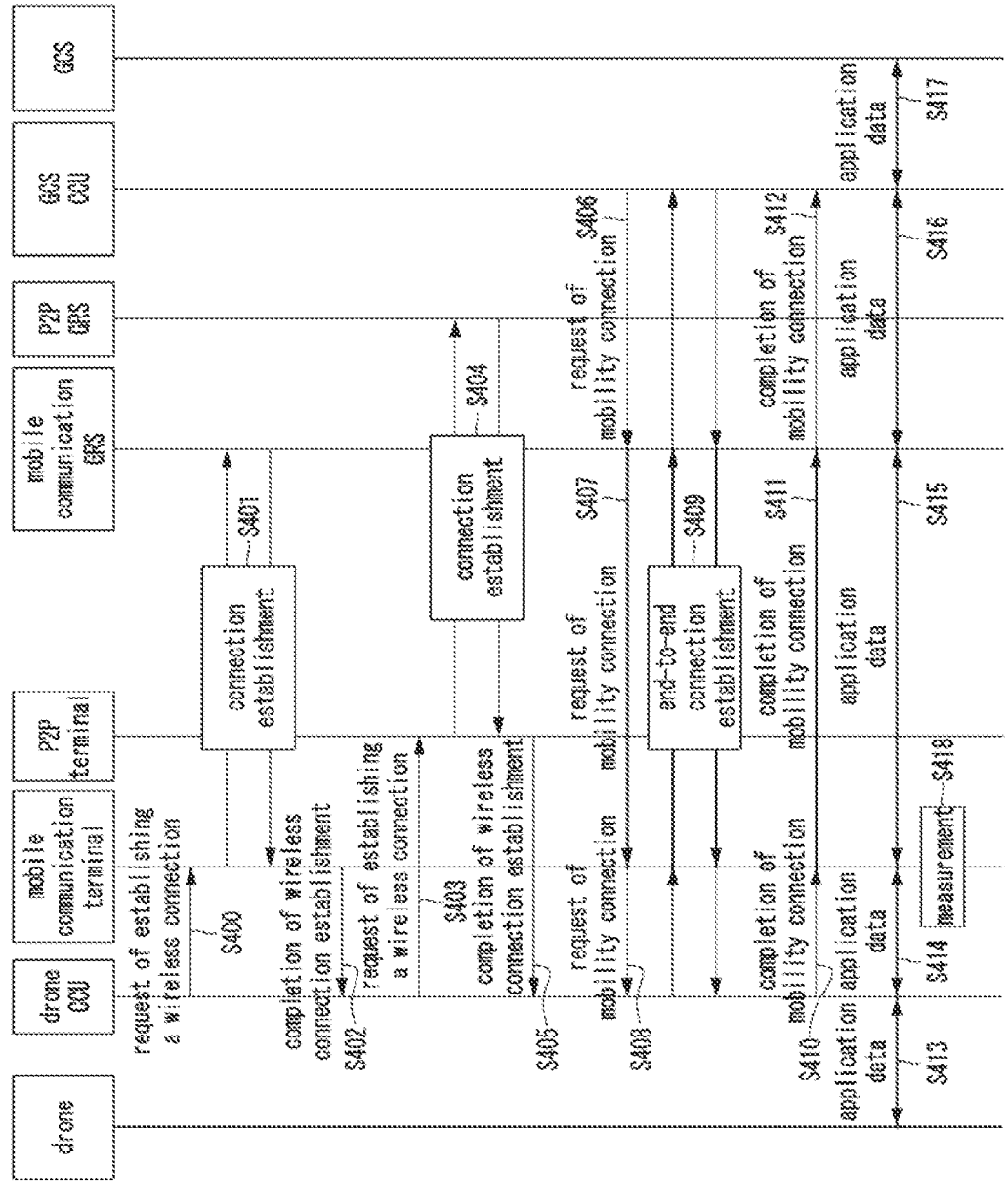
FIGS. 4A and 4B show a sequence chart illustrating a second exemplary embodiment of a method for interworking between multiple drone communications.
Figure 4B:
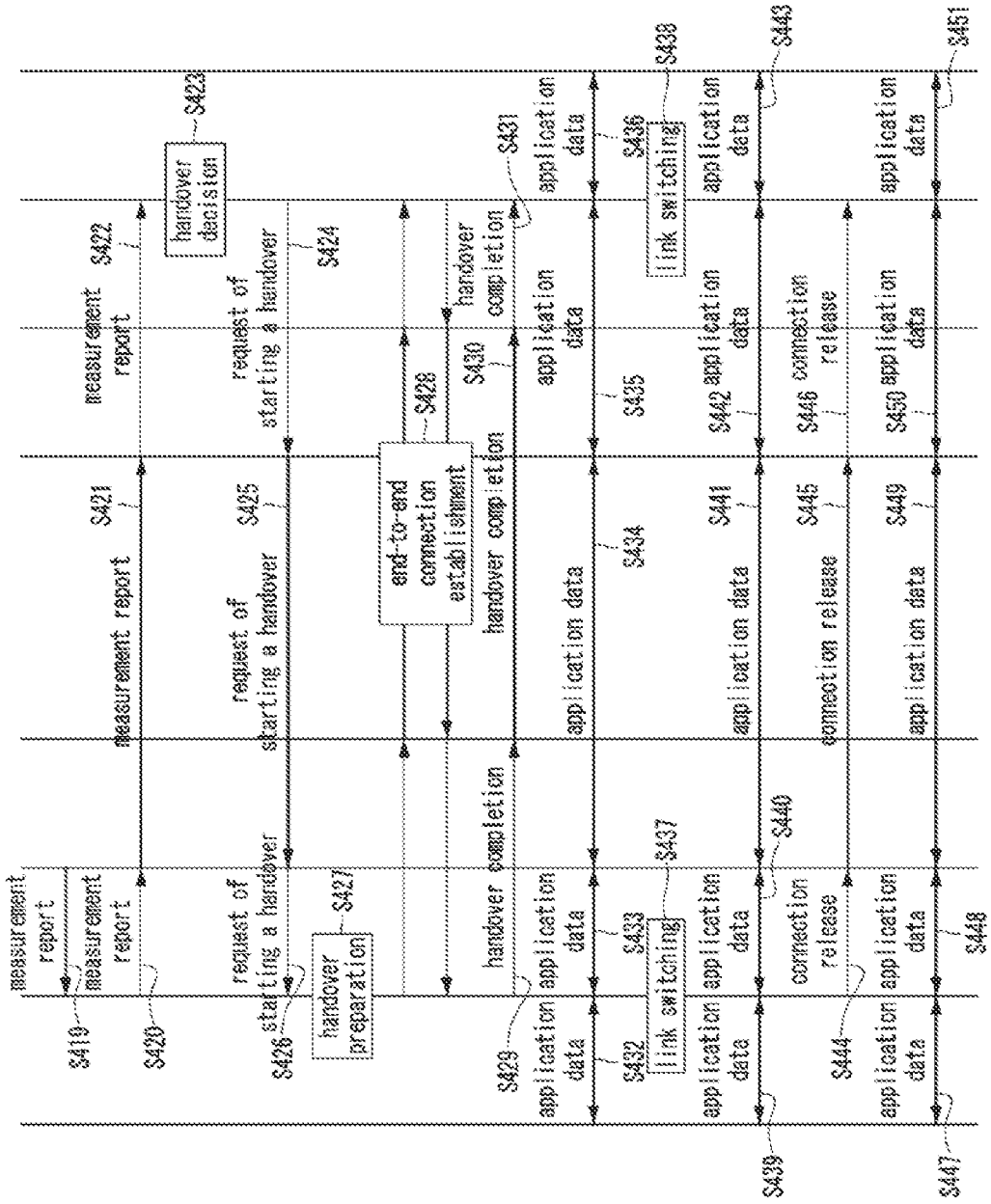

FIGS. 4A and 4B show a sequence chart illustrating a second exemplary embodiment of a method for interworking between multiple drone communications.

Referring to FIGS. 4A and 4B, in a method for interworking between multiple drone communications, a drone CCU mounted on a drone may request establishment of a wireless connection from a P2P terminal that supports Wi-Fi or direct RF communication mounted on the drone (S400). Accordingly, the P2P terminal may establish a wireless connection with a P2P GRS that is connected to a GCS and supports Wi-Fi or direct RF communication (S401). Thereafter, the P2P terminal may report the establishment of the wireless connection to the drone CCU (S402), and may be in a standby state. On the other hand, the drone CCU mounted on the drone may request establishment of a wireless connection from a mobile communication terminal supporting LTE or 5G communication mounted on the drone (S403). Accordingly, the mobile communication terminal may establish a wireless connection with a mobile communication GRS that is connected to the GCS and supports LTE or 5G communication (S404). Thereafter, the mobile terminal may report the establishment of the wireless connection to the drone CCU (S405), and may be in a standby state.

On the other hand, when a CCU of the GCS (i.e., GCS CCU) prefers a Wi-Fi or direct RF communication link, it may transmit a request of mobility connection (e.g., link switch request) to a Wi-Fi or direct RF communication link to the drone CCU through the P2P GRS and the P2P terminal (S406 to S408). Upon receiving the request of mobility connection, the drone CCU and the GCS CCU may establish an end-to-end connection (S409) and complete the mobility connection (S410 to S412). When the end-to-end connection establishment between the drone CCU and the GCS CCU is completed as in the above-described manner, application data such as TC data, TM data, and mission data may be transmitted and received between the drone and the GCS through the Wi-Fi or direct RF communication link (S413 to S417). While the communication link is operated in the above-described manner, the P2P terminal may measure a communication quality (e.g., signal strength, SINR, SNR, etc.) of the Wi-Fi or direct RF communication link (S418), and periodically report the measured communication quality to the GCS CCU via the drone CCU (S419 to S422).

The GCS CCU may determine a handover when the communication link quality does not satisfy a required performance threshold based on the periodically reported communication quality (S423). In addition, when the GCS CCU determines the handover, it may initiate a handover procedure and request the drone CCU to start the handover through the Wi-Fi or direct RF communication link (S424 to S426). The drone CCU receiving the handover start request may prepare for the handover (S327), and may establish another end-to-end connection with the GCS CCU through the previously established LTE or 5G communication link (S428).

Of course, unlike the above-described procedure, the drone CCU may not establish the LTE or 5G communication link in advance, and after receiving the handover start request from the GCS CCU, it may proceed with the establishment process. In this case, since the mobile communication terminal does not enter the standby state in advance, there is an advantage in that power consumption can be reduced, but there may be a delay when a quick handover is required. Accordingly, in consideration of the safety of flight operation, it may be preferable that the drone CCU completes the establishment of the LTE or 5G communication link in advance and the mobile communication terminal waits in the standby state.

Upon completion of the establishment of the end-to-end connection based on the LTE or 5G communication, the drone CCU may report the completion of the handover to the GCS CCU (S429 to S431). In addition, the drone CCU may switch its communication link from the Wi-Fi or direct RF communication link to the LTE or 5G communication link (S437) to transmit/receive data through the LTE or 5G communication link. In this case, the GCS CCU may also switch its communication link from the Wi-Fi or direct RF communication link to the LTE or 5G communication link (S438) to transmit/receive data through the LTE or 5G communication link. Accordingly, application data such as TC, TM, and mission data between the drone and the GCS may be transmitted/received through the LTE or 5G communication link (S439 to S443). Of course, before the drone CCU and the GCS CCU switch their communication link from the Wi-Fi or direct RF communication link to the LTE or 5G communication link, application data may still be transmitted and received through the Wi-Fi or direct RF communication link (S429 to S431). As such, the communication link between the drone CCU and the GCS CCU may not be interrupted except for a very short time during which the drone CCU and the GCS CCU perform the link switching, so that seamless data transmission and reception may be possible. The drone CCU may release the Wi-Fi or direct RF communication based end-to-end communication link when data transmission/reception starts through the LTE or 5G based end-to-end communication link (S444 to S446), and the Wi-Fi or direct RF communication link may be remained in the established state. Here, the drone CCU may release the Wi-Fi or direct RF communication link to reduce power consumption. Thereafter, application data such as TC data, TM data, and mission data between the drone and the GCS may be continuously transmitted/received through the LTE or 5G communication link (S447 to S451).

In the second exemplary embodiment of the method for interworking between multi-drone communications as described above, the P2P terminal may be a Wi-Fi slave, and the P2P GRS may be an access point that is a Wi-Fi master. In contrast, in the second exemplary embodiment, the P2P terminal may be a direct RF terminal, and the P2P GRS may be a direct RF radio station. In addition, the second exemplary embodiment may show a specific handover procedure for Interworking Scenario 1-2.

FIGS. 5A and 5B show a sequence chart illustrating a third exemplary embodiment of a method for interworking between multiple drone communications.

Referring to FIGS. 5A and 5B, in a method for interworking between multiple drone communications, a drone CCU mounted on a drone may request establishment of a wireless connection from a mobile communication terminal that supports LTE or 5G communication mounted on the drone (S500). Accordingly, the mobile communication terminal may establish a wireless connection with a mobile communication GRS that is connected to a GCS and supports LTE or 5G communication (S501). Thereafter, the mobile communication terminal may report the establishment of the wireless connection to the drone CCU (S502), and may be in a standby state. On the other hand, the drone CCU mounted on the drone may request establishment of a wireless connection from a P2P terminal supporting Wi-Fi or direct RF communication mounted on the drone (S503). Accordingly, the P2P terminal may establish a wireless connection with a P2P GRS that is connected to the GCS and supports Wi-Fi or direct RF communication (S504). Thereafter, the P2P terminal may report the establishment of the wireless connection to the drone CCU (S505), and may be in a standby state.

On the other hand, when a CCU of the GCS (i.e., GCS CCU) prefers an LTE or 5G communication link, it may transmit a request of mobility connection (e.g., link switch request) to an LTE or 5G communication link to the drone CCU through the mobile communication GRS and the mobile communication terminal (S506 to S508). Upon receiving a mobility connection response to the request of mobility connection, the drone CCU and the GCS CCU may establish an end-to-end connection (S509) and complete the mobility connection (S510 to S512). When the end-to-end connection establishment between the drone CCU and the GCS CCU is completed as in the above-described manner, application data such as TC data, TM data, and mission data may be transmitted and received between the drone and the GCS through the LTE or 5G communication link (S513 to S517). While the communication link is operated in the above-described manner, the mobile communication terminal may measure a communication quality (e.g., signal strength, SINR, SNR, etc.) of the LTE or 5G communication link (S518), and periodically report the measured communication quality to the GCS CCU via the drone CCU (S519 to S522).

The GCS CCU may determine a handover when the communication link quality does not satisfy a required performance threshold based on the periodically reported communication quality (S523). In addition, when the GCS CCU determines the handover, it may initiate a handover procedure and request the drone CCU to start the handover through the LTE or 5G communication link (S524 to S526). The drone CCU receiving the handover start request may prepare for the handover (S527), and may release the end-to-end connection establishment based on the LTE or 5G communication link (S533). In this case, the drone CCU and the GCS CCU may keep the LTE or 5G communication link in the connection-established state. Here, the drone CCU may release the LTE or 5G connection establishment to reduce power consumption. Of course, before the drone CCU and the GCS CCU switch the communication link from the LTE or 5G communication link to the Wi-Fi or direct RF communication link, application data may still be transmitted and received through the LTE or 5G communication link. (S528-S532).

Meanwhile, the drone CCU may switch its communication link from the LTE or 5G communication link to the Wi-Fi or direct RF communication link (S534). In addition, the GCS CCU may switch its communication link from the LTE or 5G communication link to the Wi-Fi or direct RF communication link (S535). In addition, the drone CCU and the GCS CCU may establish another end-to-end connection through the previously established Wi-Fi or direct RF communication link (S536). Of course, unlike the above-described procedure, the drone CCU may not establish the Wi-Fi or direct RF communication link in advance, and after receiving the handover start request from the GCS CCU, the drone CCU may proceed with the establishment process. In this case, since the P2P terminal does not enter the standby state in advance, power consumption thereof may be reduced, but there may be a delay when a quick handover is required. Accordingly, in consideration of the safety of flight operations, it may be preferable that the drone CCU completes the establishment of the Wi-Fi or direct RF communication link in advance and the P2P terminal waits in the standby state.

Upon completion of the establishment of the end-to-end connection based on the Wi-Fi or direct RF communication, the drone CCU may report the completion of the handover to the GCS CCU (S537 to S539). In addition, application data such as TC data, TM data, and mission data between the drone and the GCS may be transmitted/received through the Wi-Fi or direct RF communication link (S540 to S544).

In the third exemplary embodiment of the method for interworking between multi-drone communications as described above, the P2P terminal may be a Wi-Fi slave, and the P2P GRS may be an access point that is a Wi-Fi master. Alternatively, in the third exemplary embodiment, the P2P terminal may be a direct RF terminal, and the P2P GRS may be a direct RF radio station. In addition, the third exemplary embodiment may show a specific handover procedure for Interworking Scenario 1-3. In the third exemplary embodiment as described above, the LTE or 5G communication connection may be released in the drone CCU and the GCS CCU, and a link interruption may occur until the end-to-end connection based on the Wi-Fi or direct RF communication is established through the link switching. As such, the link interruption may occur, so that the third exemplary embodiment may have a disadvantage in that a time of the link interruption is longer than that of the first and second exemplary embodiments. However, the third exemplary embodiment may have an advantage in that it is not necessary to simultaneously establish and maintain two end-to-end communication connections compared to the cases of the first and second exemplary embodiments.

Figure 6B:
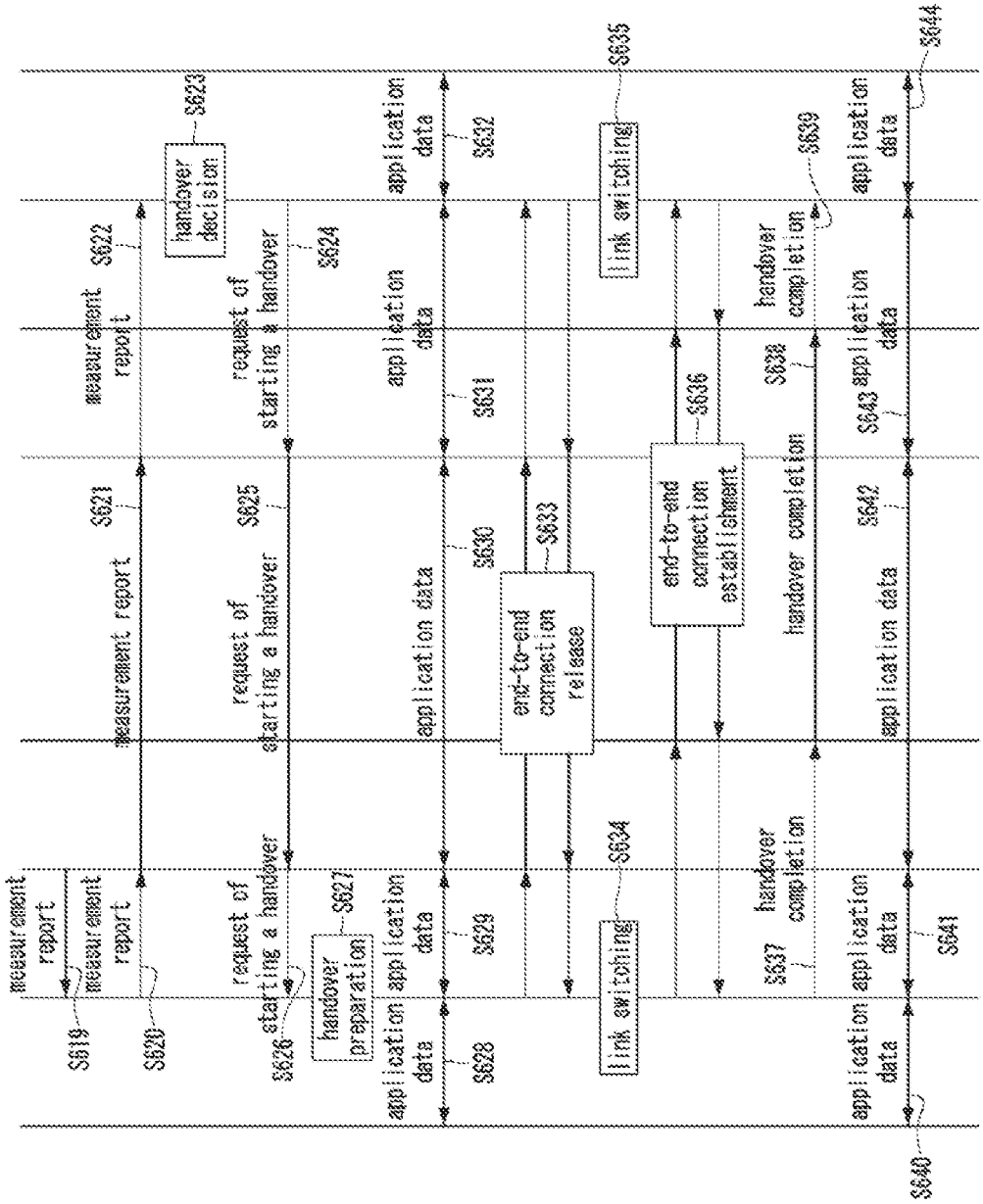

FIGS. 6A and 6B show a sequence chart illustrating a fourth exemplary embodiment of a method for interworking between multiple drone communications.

Referring to FIGS. 6A and 6B, in a method for interworking between multiple drone communications, a drone CCU mounted on a drone may request establishment of a wireless connection from a P2P terminal that supports Wi-Fi or direct RF communication mounted on the drone (S600). Accordingly, the P2P terminal may establish a wireless connection with a P2P GRS that is connected to a GCS and supports Wi-Fi or direct RF communication (S601). Thereafter, the P2P terminal may report the establishment of the wireless connection to the drone CCU (S602), and may be in a standby state. On the other hand, the drone CCU mounted on the drone may request establishment of a wireless connection from a mobile communication terminal supporting LTE or 5G communication mounted on the drone (S603). Accordingly, the mobile communication terminal may establish a wireless connection with a mobile communication GRS that is connected to the GCS and supports LTE or 5G communication (S604). Thereafter, the mobile terminal may report the establishment of the wireless connection to the drone CCU (S605), and may be in a standby state.

On the other hand, when a CCU of the GCS (i.e., GCS CCU) prefers a Wi-Fi or direct RF communication link, it may transmit a request of mobility connection to a Wi-Fi or direct RF communication link to the drone CCU through the P2P GRS and the P2P terminal (S606 to S608). Upon receiving the request of mobility connection, the drone CCU and the GCS CCU may establish an end-to-end connection (S409) and complete the mobility connection (S610 to S612). When the end-to-end connection establishment between the drone CCU and the GCS CCU is completed as in the above-described manner, application data such as TC data, TM data, and mission data may be transmitted and received between the drone and the GCS through the Wi-Fi or direct RF communication link (S613 to S617). While the communication link is operated in the above-described manner, the P2P terminal may measure a communication quality (e.g., signal strength, SINR, SNR, etc.) of the Wi-Fi or direct RF communication link (S618), and periodically report the measured communication quality to the GCS CCU via the drone CCU (S619 to S622).

The GCS CCU may determine a handover when the communication link quality does not satisfy a required performance threshold based on the periodically reported communication quality (S623). In addition, when the GCS CCU determines the handover, it may initiate a handover procedure and request the drone CCU to start the handover through the Wi-Fi or direct RF communication link (S624 to S626). The drone CCU receiving the handover start request may prepare for the handover (S627), and may release the end-to-end connection establishment based on the Wi-Fi or direct RF communication link (S633). In this case, the drone CCU and the GCS CCU may keep the Wi-Fi or direct RF communication link in the connection-established state. Here, the drone CCU may release the Wi-Fi or direct RF connection establishment to reduce power consumption. Of course, before the drone CCU and the GCS CCU switch the communication link from the Wi-Fi or direct RF communication link to the LTE or 5G communication link, application data may still be transmitted and received through the Wi-Fi or direct RF communication link. (S628-S632).

On the other hand, the drone CCU may switch its communication link from the Wi-Fi or direct RF communication link to the LTE or 5G communication link (S634). In addition, the GCS CCU may switch its communication link from the Wi-Fi or direct RF communication link to the LTE or 5G communication link (S635). In addition, the drone CCU and the GCS CCU may establish another end-to-end connection through the previously established LTE or 5G communication link (S636). Of course, unlike the above-described procedure, the drone CCU may not establish the LTE or 5G communication link in advance, and after receiving the handover start request from the GCS CCU, the drone CCU may proceed with the establishment process. In this case, since the mobile communication terminal does not enter the standby state in advance, power consumption thereof may be reduced, but there may be a delay when a quick handover is required. Accordingly, in consideration of the safety of flight operations, it may be preferable that the drone CCU completes the establishment of the LTE or 5G communication link in advance and the mobile communication terminal waits in the standby state.

On the other hand, upon completion of the establishment of the end-to-end connection based on the LTE or 5G communication link, the drone CCU may report the completion of the handover to the GCS CCU (S637 to S639). In addition, application data such as TC data, TM data, and mission data between the drone and the GCS may be transmitted/received through the LTE or 5G communication link (S640 to S644).

In the fourth exemplary embodiment of the method for interworking between multi-drone communications as described above, the P2P terminal may be a Wi-Fi slave, and the P2P GRS may be an access point that is a Wi-Fi master. Alternatively, in the fourth exemplary embodiment, the P2P terminal may be a direct RF terminal, and the P2P GRS may be a direct RF radio station. In addition, the third exemplary embodiment may show a specific handover procedure for Interworking Scenario 1-4. In the fourth exemplary embodiment as described above, the Wi-Fi or direct RF communication connection may be released in the drone CCU and the GCS CCU, and a link interruption may occur until the end-to-end connection based on the LTE or 5G communication is established through the link switching. As such, the link interruption may occur, so that the fourth exemplary embodiment may have a disadvantage in that a time of the link interruption is longer than that of the first and second exemplary embodiments. However, the fourth exemplary embodiment may have an advantage in that it is not necessary to simultaneously establish and maintain two end-toend communication connections compared to the cases of the first and second exemplary embodiments.

On the other hand, the specific handover procedures for Interworking Scenarios 1-1 to 1-4 may be applied to Interworking Scenarios 2-1 to 2-4 as they are when the Wi-Fi or direct RF communication is substituted with a CNPC network communication. In the same principle, the specific handover procedures for Interworking Scenarios 1-1 to 1-4 may be applied to Interworking Scenarios 3-1 to 3-4 as they are when the LTE or 5G communication is substituted with a CNPC P2P communication. Here, the first to fourth exemplary embodiments of the method for interworking between multi-drone communications may refer to handover procedures when one drone and one GCS are connected through multiple communication links. The handover when one drone and one GCS are connected through multiple communication links as described above may be referred to as a 'communication link handover'. In contrast, a 'GCS handover' may be defined as a handover procedure between multiple GCSs. Such the GCS handover may be applicable to Interworking Scenarios 4-1 to 4-4, Interworking Scenarios 5-1 to 5-4, and Interworking Scenarios 6-1 to 6-4. Accordingly, hereinafter, Interworking Scenarios 5-1 to 5-4 will be representatively described.

Figure 7A:
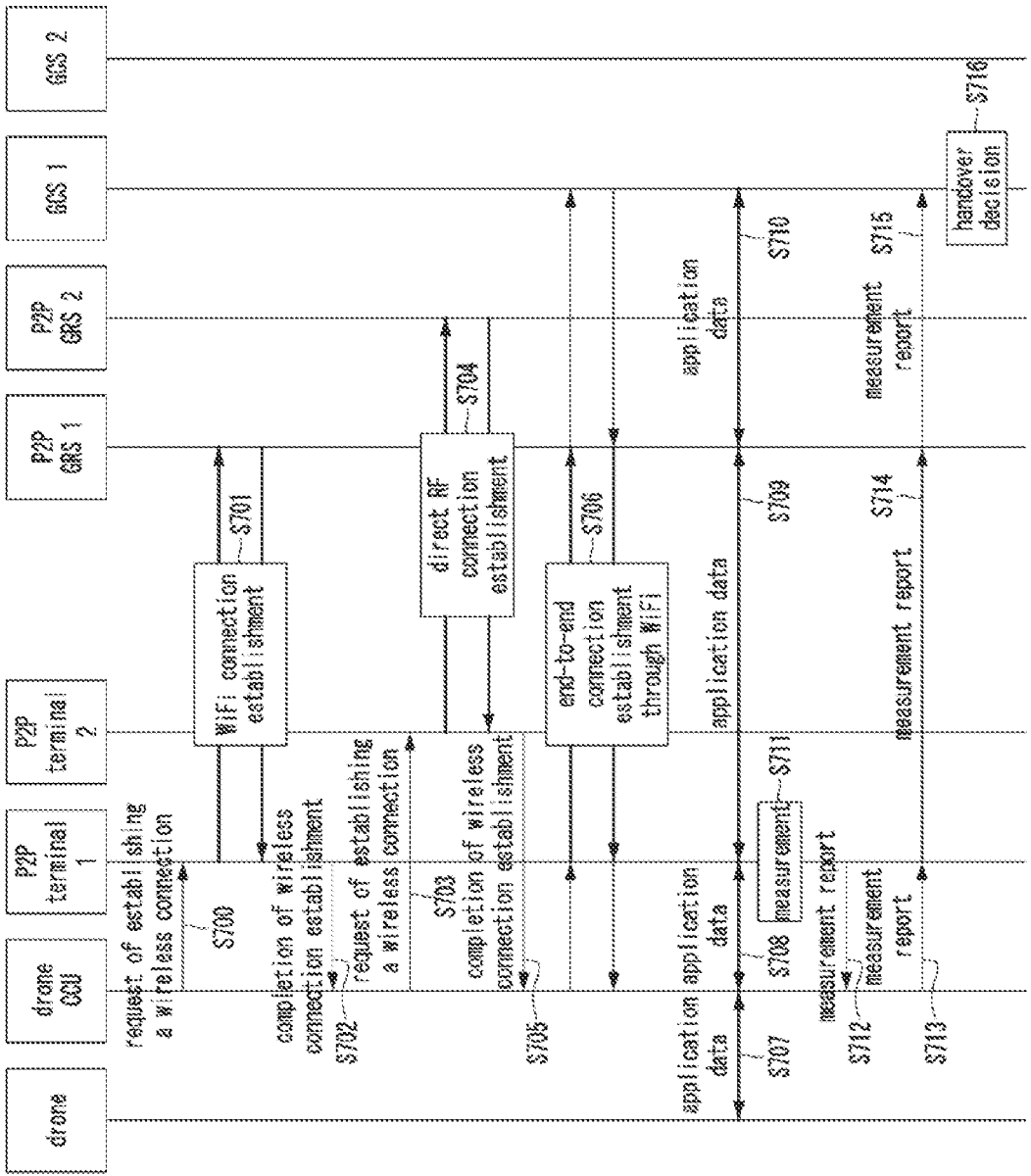
FIGS. 7A and 7B show a sequence chart illustrating a fifth exemplary embodiment of a method for interworking between multiple drone communications.
Figure 7B:
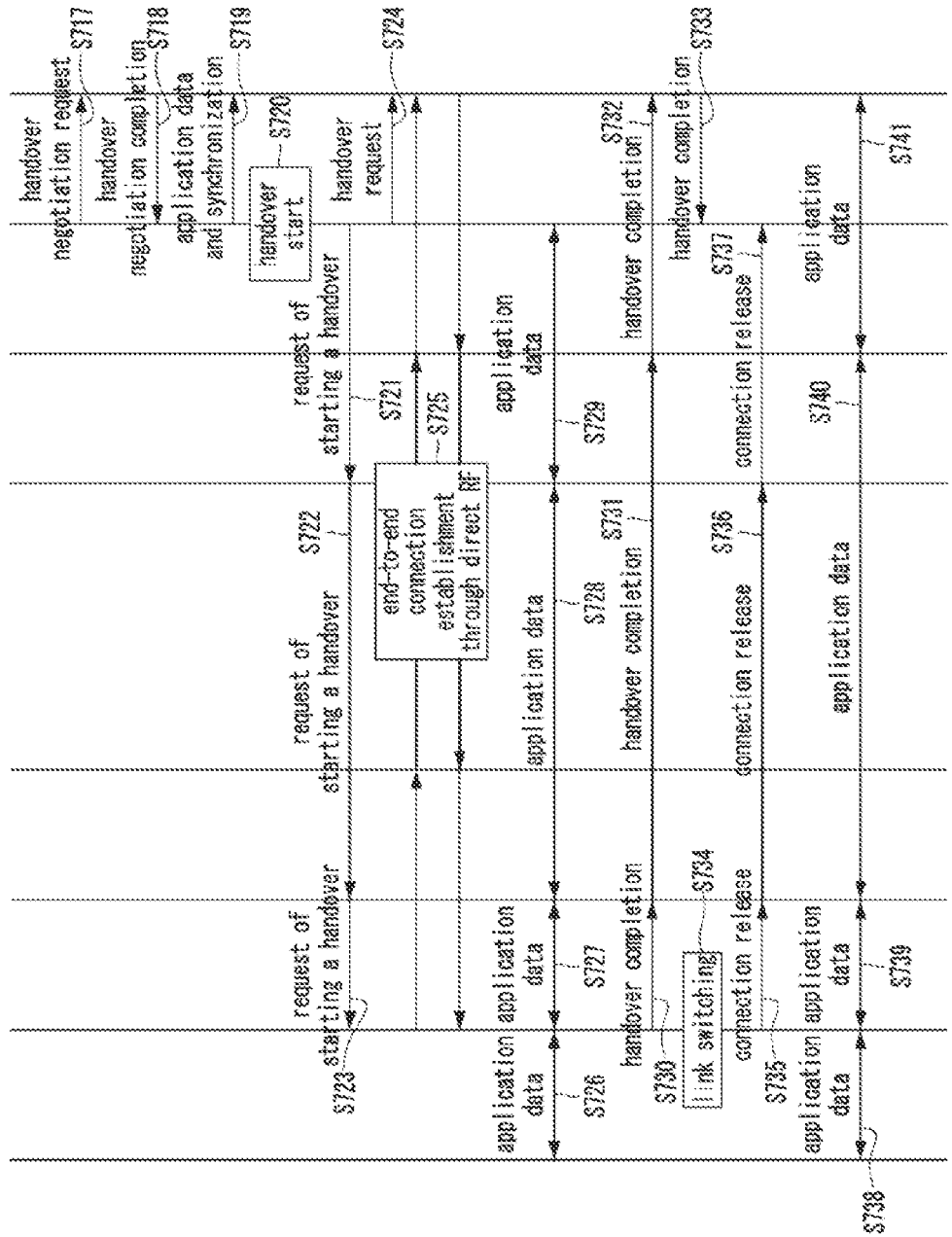

FIGS. 7A and 7B show a sequence chart illustrating a fifth exemplary embodiment of a method for interworking between multiple drone communications.

Referring to FIGS. 7A and 7B, in a method for interworking between multiple drone communications, a drone CCU mounted on a drone may request establishment of a wireless connection from a first P2P terminal that supports Wi-Fi communication mounted on the drone (S400). Accordingly, the first P2P terminal may establish a wireless connection with a first P2P GRS that is connected to a first GCS and supports Wi-Fi communication (S701). Thereafter, the first P2P terminal may report the establishment of the wireless connection to the drone CCU (S702), and may be in a standby state. On the other hand, the drone CCU mounted on the drone may request establishment of a wireless connection from a second P2P terminal supporting direct RF communication mounted on the drone (S703). Accordingly, the second P2P terminal may establish a wireless connection with a second P2P GRS that is connected to a second GCS and supports direct RF communication (S704). Thereafter, the second P2P terminal may report the establishment of the wireless connection to the drone CCU (S705), and may be in a standby state.

On the other hand, when the drone CCU prefers Wi-Fi communication, it may establish an end-to-end connection with the first GCS via the first P2P terminal and the first P2P GRS (S706). As such, when the end-to-end connection between the drone CCU and the first GCS is established, application data such as TC data, TM data, and mission data may be transmitted/received between the drone and the first GCS through Wi-Fi communication (S707 to S710). As described above, while the Wi-Fi communication link is being operated, the first P2P terminal may measure a communication quality (e.g., signal strength, SNIR, SNR, etc.) on the Wi-Fi communication link (S711), and periodically report the measured communication quality to the first GCU through the drone CCU (S712 to S715).

The first GCS may determine a handover when the communication link quality does not satisfy a required performance threshold based on the periodically reported communication quality (S716). Thereafter, the first GCS may request a handover negotiation from the second GCS to perform the handover negotiation (S717). When the first GCS receives a notification from the second GCS that the handover negotiation is completed, the first GCS may complete the handover negotiation (S718). Accordingly, when the negotiation is completed, the first GCS and the second GCS may synchronize application data and establishment information exchanged with the drone (S719). Here, it may be assumed that the first GCS and the second GCS can directly communicate with each other. When the synchronization is completed, the first GCS may request the drone CCU and the second GCS to start the handover (S721 to S724). When the drone CCU receives the handover start request from the first GCS, it may establish an end-to-end connection with the second GCS based on the previously-established direct RF communication connection between the second P2P terminal and the second P2P GRS (S725). The drone CCU may notify completion of the handover to the second GCS when the end-to-end connection establishment is completed (S730 to S732). Accordingly, when the connection establishment is completed, the second GCS may notify the first GCS of the completion of the handover (S724). In addition, the drone CCU may switch its communication link from the Wi-Fi communication link to the direct RF communication link (S734), and transmit/receive data through the direct RF communication link. Thereafter, the drone CCU may release the end-to-end connection based on the Wi-Fi communication with the first GCS (S735 to S737). Accordingly, application data such as TC data, TM data, and mission data between the drone and the second GCS may be directly transmitted and received through the RF communication link (S738 to S741). Of course, before the direct RF communication link between the drone CCU and the second GCS is established, the drone CCU may still transmit and receive application data to and from the first GCS through the Wi-Fi communication link (S726 to S729).

In the fifth exemplary embodiment of the method for interworking between multi-drone communications as described above, the first P2P terminal may be a Wi-Fi slave, the second P2P terminal may be a direct RF terminal, the first P2P GRS may be an access point that is a Wi-Fi master, and the second P2P GRS may be a direct RF radio station. The fifth exemplary embodiment as described above may be applied even when the second P2P terminal is a P2P CNPC terminal and the second P2P GRS is a P2P CNPC radio station. In addition, the fifth exemplary embodiment may show a specific handover procedure for Interworking Scenario 5-1. Since Interworking Scenario 5-2 may be performed similarly to the fifth exemplary embodiment, a specific procedure thereof may be omitted.

FIGS. 8A and 8B show a sequence chart illustrating a sixth exemplary embodiment of a method for interworking between multiple drone communications.

Referring to FIGS. 8A and 8B, in a method for interworking between multiple drone communications, a drone CCU mounted on a drone may request establishment of a wireless connection from a first P2P terminal that supports Wi-Fi communication mounted on the drone (S800). Accordingly, the first P2P terminal may establish a wireless connection with a first P2P GRS that is connected to a first GCS and supports Wi-Fi communication (S801). Thereafter, the first P2P terminal may report the establishment of the wireless connection to the drone CCU (S802), and may be in a standby state. On the other hand, the drone CCU mounted on the drone may request establishment of a wireless connection from a second P2P terminal supporting direct RF communication mounted on the drone (S803). Accordingly, the second P2P terminal may establish a wireless connection with a second P2P GRS that is connected to a second GCS and supports direct RF communication (S804). Thereafter, the second P2P terminal may report the establishment of the wireless connection to the drone CCU (S805), and may be in a standby state.

On the other hand, when the drone CCU prefers Wi-Fi communication, it may establish an end-to-end connection with the first GCS via the first P2P terminal and the first P2P GRS (S806). As such, when the end-to-end connection between the drone CCU and the first GCS is established, application data such as TC data, TM data, and mission data may be transmitted/received between the drone and the first GCS through Wi-Fi communication (S807 to S810). As described above, while the Wi-Fi communication link is being operated, the first P2P terminal may measure a communication quality (e.g., signal strength, SNIR, SNR, etc.) on the Wi-Fi communication link (S811), and periodically report the measured communication quality to the first GCU through the drone CCU (S812 to S815).

The first GCS may determine a handover when the communication link quality does not satisfy a required performance threshold based on the periodically reported communication quality (S816). Thereafter, the first GCS may request a handover negotiation from the second GCS to perform the handover negotiation (S817). When the first GCS receives a notification from the second GCS that the handover negotiation is completed, the first GCS may complete the handover negotiation (S818). Accordingly, when the negotiation is completed, the first GCS and the second GCS may synchronize application data and establishment information exchanged with the drone (S819). Here, it may be assumed that the first GCS and the second GCS can directly communicate with each other. When the synchronization is completed, the first GCS may request the drone CCU and the second GCS to start the handover (S821 to S824). When the drone CCU receives the handover start request from the first GCS, it may release the end-to-end connection with the first GCS (S825).

In addition, the drone CCU may switch its communication link from the Wi-Fi communication link to the direct RF communication link (S826), so that the drone CCU may establish an end-to-end connection with the second GCS based on the direct RF communication connection between the second P2P terminal and the second P2P GRS (S827). Accordingly, application data such as TC data, TM data, and mission data between the drone and the second GCS may be directly transmitted and received through the direct RF communication link (S828 to S831). On the other hand, the drone CCU may notify completion of the handover to the second GCS when the end-to-end connection establishment is completed (S832 to S834). Accordingly, the second GCS may notify completion of the handover to the first GCS when the connection establishment is completed (S835).

In the sixth exemplary embodiment of the method for interworking between multi-drone communications as described above, the first P2P terminal may be a Wi-Fi slave, the second P2P terminal may be a direct RF terminal, the first P2P GRS may be an access point that is a Wi-Fi master, and the second P2P GRS may be a direct RF radio station. The sixth exemplary embodiment as described above may be applied even when the second P2P terminal is a P2P CNPC terminal and the second P2P GRS is a P2P CNPC radio station. In addition, the sixth exemplary embodiment may show a specific handover procedure for Interworking Scenario 5-3. Since Interworking Scenario 5-4 may be performed similarly to the sixth exemplary embodiment, a specific procedure thereof may be omitted.

Figure 9A:
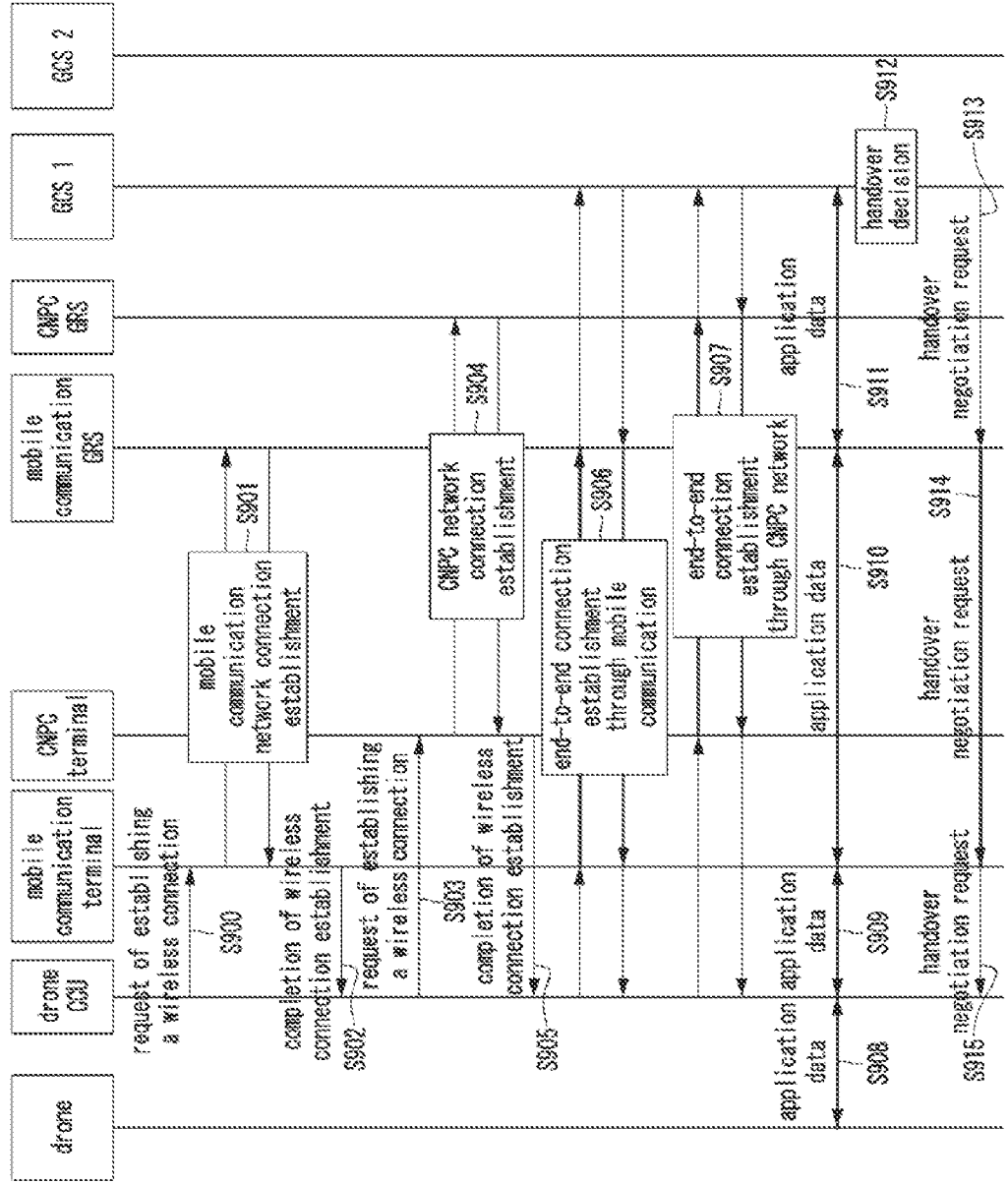

FIGS. 9A and 9B show a sequence chart illustrating a ninth exemplary embodiment of a method for interworking between multiple drone communications.

Referring to FIGS. 9A and 9B, in a method for interworking between multiple drone communications, a drone CCU mounted on a drone may request establishment of a wireless connection from a mobile communication terminal that supports LTE or 5G communication mounted on the drone (S900). Accordingly, the mobile communication terminal may establish a wireless connection with a mobile communication GRS that is connected to a first GCS and supports LTE or 5G communication (S901). Thereafter, the mobile communication terminal may report the establishment of the wireless connection to the drone CCU (S902), and may be in a standby state. On the other hand, the drone CCU mounted on the drone may request establishment of a wireless connection from a CNPC terminal supporting CNPC communication mounted on the drone (S903). Accordingly, the CNPC terminal may establish a wireless connection with a CNPC GRS that is connected to a second GCS and supports CNPC communication (S904). Thereafter, the CNPC terminal may report the establishment of the wireless connection to the drone CCU (S905), and may be in a standby state.

On the other hand, the drone CCU may establish an end-to-end connection with the first GCS through a mobile communication network (S906), and may establish an end-to-end connection with the second GCS through a CNPC network (S907). As such, since the first GCS and the second GCS are not directly connected, the drone CCU may be in a state in which the end-to-end connection with the first GCS is established through the mobile communication network, and at the same time, the drone CCU may be in a state in which the end-to-end connection with the second GCS is established through the CNPC network. In this state, the drone and the first GCS may transmit and receive application data such as TC data, TM data, and mission data (S908 to S911). The transmission and reception of application data such as TC data, TM data, and mission data between the drone and the first GCS may be performed through the mobile communication network established between the drone CCU and the first GCS. In this situation, the end-to-end connection through the CNPC network established between the drone CCU and the second GCS may be in a standby state for exchanging handover-related control information.

On the other hand, the mobile communication terminal may measure a communication quality (e.g., signal strength, SNIR, SNR, etc.) of the communication link, and periodically report the measured communication quality to the first GCU through the drone CCU. Then, the first GCS may determine a handover when the communication link quality does not satisfy a required performance threshold based on the periodically reported communication quality (S912). Thereafter, the first GCS may request a handover negotiation from the second GCS to perform the handover negotiation. In this case, in the seventh embodiment of the method for interworking between multiple drone communications, unlike the fifth exemplary embodiment, the first GCS and the second GCS cannot be directly connected, so that the handover negotiation may be performed through the drone CCU (S913 to S918). In addition, the first GCS may complete the handover negotiation when it receives notification from the second GCS that the handover negotiation has been completed via the drone CCU (S919 to S924). As such, when the negotiation is completed, the first GCS may transmit application data to the drone CCU (S925 to S927).

Also, the first GCS may request the drone CCU to synchronize with the second GCS (S925 to S927). Accordingly, the drone CCU may perform synchronization with the second GCS to complete the synchronization (S928 to S930).

When the synchronization is completed in this manner, the first GCS may initiate a handover (S938), and may request a handover from the second GCS via the drone CCU (S939 to S944). As such, when the second GCS receives the handover request from the first GCS, the second GCS may prepare for data transmission/reception with the drone CCU through the end-to-end connection of the CNPC network, and may report completion of the handover to the drone CCU (S945 to S947). As described above, when the second GCS notifies the completion of the handover to the drone CCU, the drone and the second GCS may transmit and receive application data such as TC data, TM data, and mission data through the end-to-end connection of the CNPC network established between the drone CCU and the second GCS (S948-S951). On the other hand, the drone CCU may notify the completion of the handover to the first GCS (S952 to S953).

As such, the seventh exemplary embodiment may specifically show a procedure for a handover between the first GCS and the second GCS when direct communication between the first GCS and the second GCS is impossible in the fifth and sixth exemplary embodiments. In addition, the seventh exemplary embodiment may correspond to the case of Interworking Scenario 5-1, and in other cases, a similar procedure may be performed, and thus a detailed description thereof may be omitted.

The seventh exemplary embodiment may be similar to the fifth exemplary embodiment. However, since the first GCS and the second GCS are not directly connected, protocol information required for the handover between the first GCS and the second GCS may be exchanged via the drone CCU. For this purpose, the drone CCU may always be connected to the first GCS and the second GCS in the end-to-end manner. In this state, when the drone transmits and receives application data such as TC data, TM data, and mission data to and from the first GCS, the application data may be transmitted and received through the end-to-end connection based on the mobile communication network connection between the drone CCU and the first GCS. In this case, the end-to-end connection based on the CNPC network connection between the drone CCU and the second GCS may be in a standby state for exchanging control information for handover. Using such the connected state, in the fifth exemplary embodiment of the method for interworking between multiple drone communications, the handover negotiation process, application data and configuration synchronization process, etc. directly performed between the first GCS and the second GCS may be performed via the drone CCU. That is, the handover negotiation request and the synchronization request may be made from the first GCS to the drone CCU through the end-to-end connection based on the mobile communication network connection. In addition, the completion of the handover negotiation may be made through the end-to-end connection based on the CNPC network connection from the second GCS to the drone CCU. Unlike the fifth exemplary embodiment, the handover request procedure and the handover completion reporting procedure may also be performed via the drone CCU.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node, the operation method comprising:
   establishing a first wireless connection with a ground control station (GCS);
   establishing a second wireless connection with the GCS;
   transmitting and receiving data to and from the GCS through a first end-to-end connection based on the first wireless connection;
   reporting a communication quality of the first wireless connection to the GCS;
   receiving a link switch request from the GCS;
   switching a link from the first wireless connection to the second wireless connection based on the link switch request; and
   transmitting and receiving data through a second end-to-end connection based on the second wireless connection.

2. The operation method according to claim 1, wherein the transmitting and receiving of data to and from the GCS through a first end-to-end connection comprises:
   receiving a request of mobility connection from the GCS;
   establishing the first end-to-end connection based on the first wireless connection with the GCS according to the request of mobility connection;
   transmitting a mobility connection completion in response to the request of mobility connection to the GCS; and
   transmitting and receiving data to and from the GCS through the first end-to-end connection established in response to the request of mobility connection.

3. The operation method according to claim 1, wherein the transmitting and receiving data through a second end-to-end connection based on the second wireless connection comprises:
   establishing the second end-to-end connection with the GCS based on the second wireless connection;
   switching the link from the first wireless connection to the second wireless connection; and
   transmitting and receiving data to and from the GCS through the second end-to-end connection.

4. The operation method according to claim 3, further comprising releasing the first end-to-end connection.

5. The operation method according to claim 1, wherein the transmitting and receiving data through a second end-to-end connection based on the second wireless connection comprises:

releasing the first end-to-end connection;
switching the link to the second wireless connection by releasing the first wireless connection according to the release of the first end-to-end connection;
establishing the second end-to-end connection with the GCS based on the second wireless connection; and
transmitting and receiving application data to and from the GCS through the second end-to-end connection.

6. An operation method of a second communication node, the operation method comprising:
establishing a first wireless connection with a first communication node;
establishing a first end-to-end connection between the first communication node and a first ground control station (GCS) based on the first wireless connection;
relaying transmission and reception of data between the first communication node and the first GCS through the first end-to-end connection; and
in response to receiving a link switch request from the first GCS based on a communication quality of the first wireless connection, releasing the first end-to-end connection.

7. The operation method according to claim 6, wherein the establishing a first end-to-end connection between the first communication node and a first GCS based on the first wireless connection comprises:
receiving a request of mobility connection based on the first wireless connection from the first GCS;
transmitting the received request of mobility connection to the first communication node;
establishing the first end-to-end connection between the first communication node and the first GCS upon receiving a response to the request of mobility connection from the first communication node;
receiving a mobility connection completion from the first communication node; and
transmitting the received mobility connection completion to the first GCS.

8. The operation method according to claim 6, wherein the releasing the first end-to-end connection comprises:
receiving a communication quality of the first wireless connection from the first communication node;
transmitting the received communication quality of the first wireless connection to the first GCS;
receiving a link switch request from the first GCS;
transmitting the received link switch request to the first communication node; and
releasing the first end-to-end connection without receiving a response from the first communication node.

9. The operation method according to claim 6, further comprising:
relaying a handover negotiation between the first GCS and a second GCS in cooperation with the first communication node; and
synchronizing the first GCS and the second GCS in cooperation with the first communication node.

10. The operation method according to claim 9, wherein the relaying a handover negotiation comprises:
receiving a handover negotiation request from the first GCS, and transmitting the handover negotiation request to the second GCS via the first communication node; and
receiving a handover completion from the second GCS via the first communication node, and transmitting the handover completion to the first GCS.

11. A first communication node comprising:
a processor;
a memory electronically communicating with the processor; and
instructions stored in the memory,
wherein when executed by the processor, the instructions cause the first communication node to:
establish a first wireless connection with a ground control station (GCS);
establish a second wireless connection with the GCS;
transmit and receive data to and from the GCS through a first end-to-end connection based on the first wireless connection;
report a communication quality of the first wireless connection to the GCS;
receive a link switch request from the GCS;
switch a link from the first wireless connection to the second wireless connection based on the link switch request; and
transmit and receive data through a second end-to-end connection based on the second wireless connection.

12. The first communication node according to claim 11, wherein in the transmitting and receiving of the data through the first end-to-end connection, the instructions cause the first communication node to:
receive a request of mobility connection from the GCS;
establish the first end-to-end connection based on the first wireless connection with the GCS according to the request of mobility connection;
transmit a mobility connection completion in response to the request of mobility connection to the GCS; and
transmit and receive data to and from the GCS through the first end-to-end connection established in response to the request of mobility connection.

13. The first communication node according to claim 11, wherein in the transmitting and receiving of the data through the second end-to-end connection, the instructions cause the first communication node to:
establish the second end-to-end connection with the GCS based on the second wireless connection;
switch the link from the first wireless connection to the second wireless connection; and
transmit and receive data to and from the GCS through the second end-to-end connection.

14. The first communication node according to claim 11, wherein in the transmitting and receiving of the data through the second end-to-end connection, the instructions cause the first communication node to:
release the first end-to-end connection;
switch the link to the second wireless connection by releasing the first wireless connection according to the release of the first end-to-end connection;
establish the second end-to-end connection with the GCS based on the second wireless connection; and
transmit and receive application data to and from the GCS through the second end-to-end connection.

* * * * *